(12) United States Patent
Hwang et al.

(10) Patent No.: US 11,432,362 B2
(45) Date of Patent: Aug. 30, 2022

(54) METHOD AND APPARATUS FOR PROCESSING MOBILITY IN DUAL RRC SYSTEM

(71) Applicant: Samsung Electronics Co., Ltd, Suwon-si (KR)

(72) Inventors: June Hwang, Incheon (KR); Hyunjeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 16/622,730

(22) PCT Filed: Jun. 15, 2018

(86) PCT No.: PCT/KR2018/006809
§ 371 (c)(1),
(2) Date: Dec. 13, 2019

(87) PCT Pub. No.: WO2018/231021
PCT Pub. Date: Dec. 20, 2018

(65) Prior Publication Data
US 2020/0107390 A1    Apr. 2, 2020

(30) Foreign Application Priority Data

Jun. 15, 2017  (KR) .................. 10-2017-0076073
Sep. 27, 2017  (KR) .................. 10-2017-0125584

(51) Int. Cl.
*H04W 76/27* (2018.01)
*H04W 76/19* (2018.01)
(Continued)

(52) U.S. Cl.
CPC ............. *H04W 76/27* (2018.02); *H04W 8/02* (2013.01); *H04W 76/15* (2018.02); *H04W 76/19* (2018.02); *H04W 88/06* (2013.01)

(58) Field of Classification Search
CPC .......... H04W 36/0069; H04W 36/305; H04W 76/15; H04W 76/16; H04W 76/19;
(Continued)

(56) References Cited

U.S. PATENT DOCUMENTS

2014/0293769 A1   10/2014  Chen et al.
2016/0182276 A1    6/2016  Wu et al.
(Continued)

FOREIGN PATENT DOCUMENTS

WO    2015116877 A1    8/2015

OTHER PUBLICATIONS

Intel Corporation, "Security optimizations when resuming or re-establishing an RRC connection", 3GPP TSG RAN WG2 Meeting #98, May 15-19, 2017, R2-1704773, 4 pages.
(Continued)

*Primary Examiner* — Jean A Gelin

(57) ABSTRACT

The present disclosure relates to a communication technique for convergence of IoT technology and a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. Disclosed are a method and an apparatus for improving mobility-related performance when a dual connectivity is performed using dual RRC.

14 Claims, 23 Drawing Sheets

(51) Int. Cl.
   *H04W 76/15*   (2018.01)
   *H04W 8/02*    (2009.01)
   *H04W 88/06*   (2009.01)

(58) Field of Classification Search
   CPC ..... H04W 76/20; H04W 76/27; H04W 88/02; H04W 88/06; H04W 88/08; H04W 8/02
   See application file for complete search history.

(56) References Cited

U.S. PATENT DOCUMENTS

| | | | |
|---|---|---|---|
| 2017/0265243 A1* | 9/2017 | Hahn | H04W 76/19 |
| 2018/0160339 A1* | 6/2018 | Wu | H04W 36/0069 |
| 2018/0279186 A1* | 9/2018 | Park | H04W 36/30 |
| 2018/0352491 A1* | 12/2018 | Shih | H04W 76/27 |
| 2019/0132066 A1* | 5/2019 | Park | H04W 36/00835 |
| 2019/0289510 A1* | 9/2019 | Rugeland | H04W 36/0069 |
| 2020/0187064 A1* | 6/2020 | Susitaival | H04W 36/0069 |
| 2020/0359441 A1* | 11/2020 | Yilmaz | H04W 76/27 |
| 2021/0227616 A1* | 7/2021 | Lee | H04W 28/02 |

OTHER PUBLICATIONS

Intel Corporation, "RRC Connection Reconfiguration for EN-DC operation", 3GPP TSG-RAN WG2 Meeting #98, May 15-19, 2017, R2-1704815, 6 pages.
Intel Corporation, "NR RRC state transitions to get Connected", 3GPP TSG RAN WG2 Meeting #98, R2-1704774, 5 pages.
Ericsson, "Inactive to Connected state transitions", 3GPP TSG-RAN WG2 #98, May 15-19, 2017, Tdoc R2-1704116, 6 pages.
International Search Report dated Sep. 28, 2018 in connection with International Patent Application No. PCT/KR2018/006809, 2 pages.
Written Opinion of the International Searching Authority dated Sep. 28, 2018 in connection with International Patent Application No. PCT/KR2018/006809, 5 pages.
European Patent Office, "Supplementary European Search Report" dated Feb. 26, 2021, in connection with European Patent Application No. 18818715.7, 13 pages.
Huawei, et al., "Handling on MN failure and SN failure for LTE NR tight interworking", 3GPP TSG-RAN WG2 Meeting #97bis, R2-1703655, Spokane, USA, Apr. 3-7, 2017, 4 pages.
ETSI MCC, "Report of 3GPP TSG RAN2 meeting #97bis, Spokane, USA", 3GPP TSG-RAN WG2 meeting #98, R2-1704001, Hangzhou, China, May 15-19, 2017, 173 pages.
3rd Generation Partnership Project, "Evolved Universal Terrestrial Radio Access (E-UTRA) and NR", Technical Specification Group Radio Access Network, Multi-connectivity; Stage 2 (Release 15) 3GPP TS 37.340 V0.1.1, Jun. 2017, 30 pages.
Office Action dated Aug. 13, 2021, in connection with Korean Application No. 10-2017-0125584, 12 pages.

* cited by examiner

METHOD AND APPARATUS FOR PROCESSING MOBILITY IN DUAL RRC SYSTEM

CROSS-REFERENCE TO RELATED APPLICATIONS

This application is a 371 of International Application No. PCT/KR2018/006809 filed on Jun. 15, 2018, which claims priority to Korean Patent Application No. 10-2017-0076073 filed on Jun. 15, 2017, and Korea Patent Application No. 10-2017-0125584 filed on Sep. 27, 2017, the disclosures of which are herein incorporated by reference in their entirety.

BACKGROUND

1. Field

The disclosure relates to a technology for facilitating dual connectivity with dual RRC.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A system supporting heterogeneous radio access technologies (RATs) that has been studied recently allows two separate connections to a common core system via a master node (MN) and a secondary node (SN) that establish separate RRC entities for two different RATs. In this case, the MN and SN may operate with separate radio resource control (RRC) instances, which causes a need of a new mobility management method.

SUMMARY

The disclosed embodiments aim to provide methods and apparatuses for facilitating dual RRC-based dual connectivity that are capable of improving mobility-related performance.

According to an embodiment of the disclosure, a control method of a terminal in a wireless communication system supporting dual connectivity includes transmitting a radio resource control (RRC) connection reestablishment request message including identification information of a secondary node (SN) to a second master node (MN) based on a connection to a first MN being released and receiving an RRC connection reestablishment message from the second MN based on the second MN having context information of the terminal.

According to an embodiment of the disclosure, a terminal in a wireless communication system supporting dual connectivity includes a transceiver configured to transmit and receive signals and a controller configured to control the transceiver to transmit a radio resource control (RRC) connection reestablishment request message including identification information of a secondary node (SN) to a second master node (MN) based on a connection to a first MN being released and receive an RRC connection reestablishment message from the second MN based on the second MN having context information of the terminal.

According to an embodiment of the disclosure, a control method of a master node (MN) in a wireless communication system includes receiving a radio resource control (RRC) connection reestablishment request message including identification information of a secondary node (SN) from a terminal of which a connection to another MN is released and transmitting an RRC connection reestablishment message to the terminal based on the MN having context information of the terminal.

According to an embodiment of the disclosure, a master node (MN) in a wireless communication system includes a transceiver configured to transmit and receive signals and a controller configured to control the transceiver to receive a radio resource control (RRC) connection reestablishment request message including identification information of a secondary node (SN) from a terminal of which a connection to another MN is released and transmit an RRC connection reestablishment message to the terminal based on the MN having context information of the terminal.

The dual RRC-based dual connectivity methods and apparatuses of the disclosed embodiments are advantageous in terms of facilitating a mobility-related procedure and lead to improvement of the throughput of a terminal.

DETAILED DESCRIPTION

Figure 1:
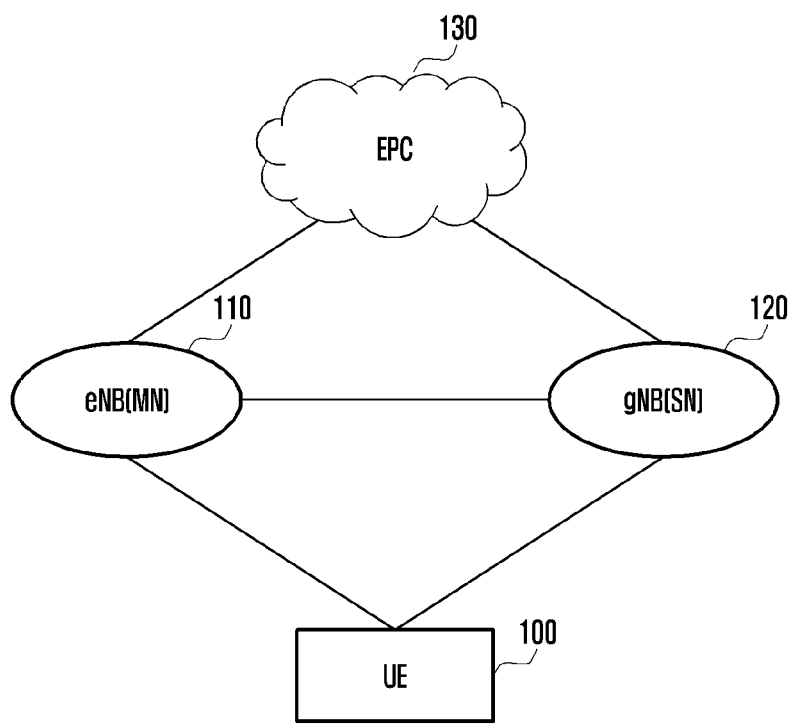
FIG. 1 is a diagram illustrating a system to which the disclosed embodiments are applied.

Exemplary embodiments of the disclosure are described in detail with reference to the accompanying drawings.

Detailed descriptions of technical specifications well-known in the art and unrelated directly to the disclosure may be omitted to avoid obscuring the subject matter of the disclosure. This aims to omit unnecessary description so as to make the subject matter of the disclosure clear.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. In an embodiment, a module may include one or more processors.

In the following description, it is assumed that two separate connections are established to a common core system via an MN and an SN that use different RATs and establish separate RRC entities.

In this case, it is assumed that the MN has an NAS signaling interface to the core network. FIG. 1 is a diagram illustrating a system to which the disclosed embodiments are applied.

In the embodiment of FIG. 1, it is assumed that the user equipment (UE) 100 is an LTE eNB, the SN 120 is an NR gNB, and the core is an EPC 130. However, the MN 110, SN 120, and core 130 may respectively be a gNB, an eNB, and an NR core, or other core and RAN nodes such as an eLTE, a gNB, and an NR core in other embodiments.

The following abbreviations apply to this document.
DC: dual connectivity
MN: master node
SN: secondary node
MR: measurement report
IE: information element
RRC: radio resource control layer
MCG: master cell group
SCG: secondary cell group
RRE: RRC connection re-establishment
RB: radio bearer
PCI: physical cell ID
HO: handover
SRB: signaling radio bearer In LTE dual connectivity (DC), there may be no RRC in the SN. Accordingly, a connection via the SN may be reactivated, if necessary, after re-establishing a connection via the MN after the release of an SCG configuration in all kinds of situations requiring an RRC level connection reestablishment procedure such as radio link problem/RRC configuration failure/others. For example, although there may be no problem with an SN link itself, if an MN link is unstable, the connection utilization of the SN links drops. A data transmission interruption may also occur for a long period of time on the SN link.

Furthermore, in the case of transmitting RRC messages processed by SN RRC through only an SCG SRB, a message delivery failure is likely to occur especially on an SN link established on an mmW frequency. There is therefore a need of a method of transmitting the SN RRC messages over an MCG SRB or an SCG SRB.

If the SN and the MN use separate independent RRCs, it is possible to maintain data communication on the SN connection during the period until the reestablishment of the MN and re-addition of the SN, which leads to reduction of SN connection interruption. It may also be possible to add 1 bit for UL path indication to a SN request message that is transmitted from the SN to a UE in order for the UE to select one of the MCG SRB and SCG SRB and proceed to transmit the response RRC message on the selected SRB.

Embodiment 1

Figure 2:
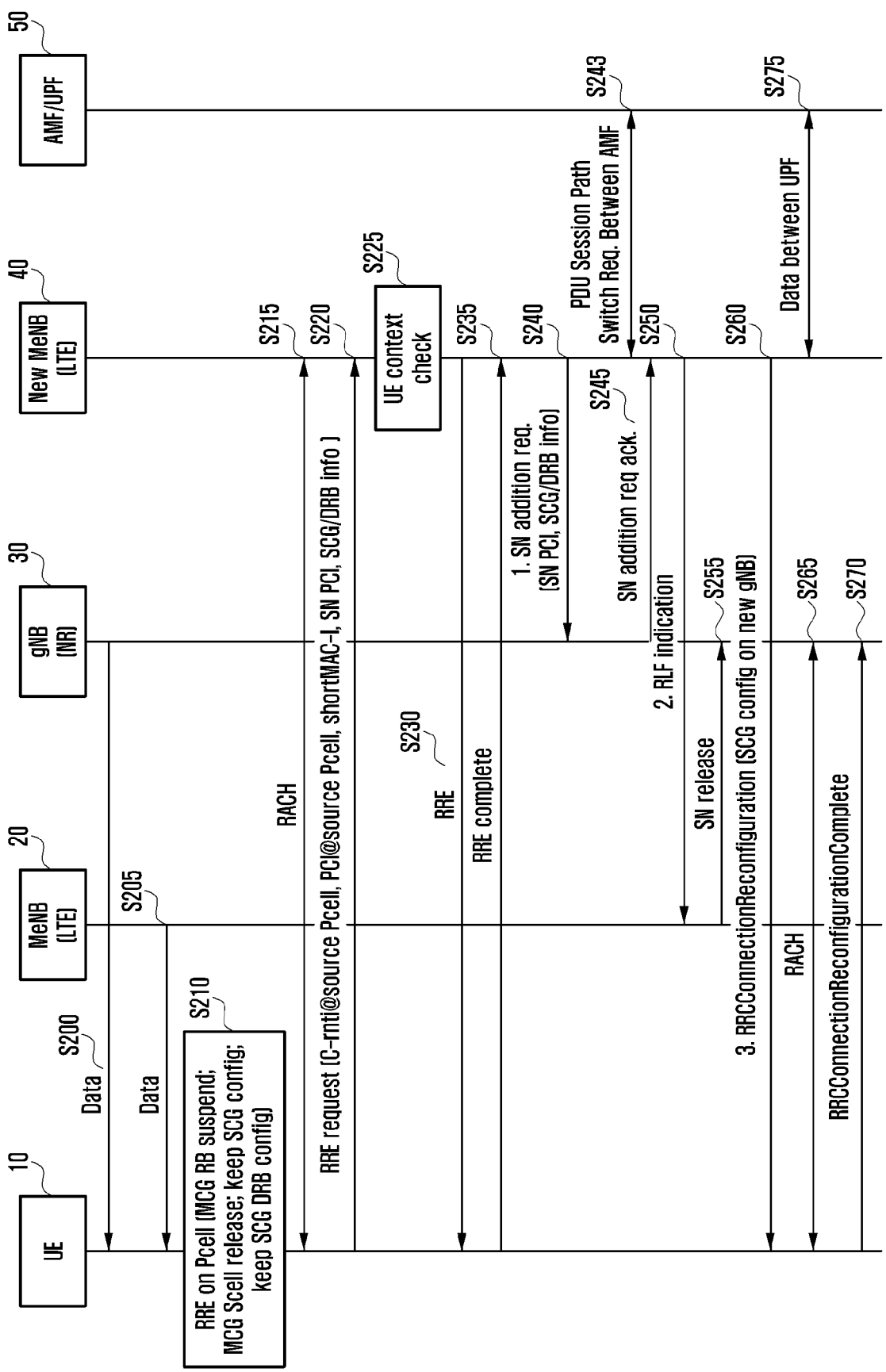
FIG. 2 is a signal flow diagram illustrating embodiment 1.

FIG. 2 is a signal flow diagram illustrating embodiment 1.

In all of embodiments 1, 2, and 3, it is assumed that an SN-side SRB (e.g., SRB3) is preconfigured to a UE and an SN or an MN configures SRB3 before a failure occurs.

FIG. 2 shows a procedure according to an embodiment in which a UE 10 is connected to an LTE eNB as the MN 20 and an NR gNB as the SN 30 as described with reference to FIG. 1. The UE 10 may receive data from the MN 20 and the SN 30 at steps S200 and S205.

At step S210, upon detecting an MN failure, the UE 10 may first suspend the MCG RB. Examples of the MN failure detected by the UE 10 may include at least one of an MCG radio link failure, an MCG integrity failure, an MCG reconfiguration failure, and an HO failure.

The UE 10 may also release the MCG Scell. The UE 10 may maintain the SCG configuration and the DRB associated with the SCG and the SCG DRB configuration. Here, the DRB associated with the SCG may be an SCG-direct or split DRB, SRB, MCG DRB, or SCG part of the SRB. The UE 10 and the gNB as the SN 30 may continue packet communication over the SCG DRB. The packet may include RRC signaling on the SCG and data for the UE. The packet communication via the SN gNB 30 may be maintained until the UE that has found a new MN cell and successfully connected to the MN cell performs SCG reconfiguration via the new MN cell.

At step S215, the UE may select a cell and perform an RACH procedure with an appropriate MN cell 40. After performing the RACH procedure, the UE 10 may transmit an RRE request message to the newly connected MN cell 40 at step S220. Here, the RRE request message may include an ID of the gNB cell 30 operated as the SN (ID for identifying a cell such as physical cell ID or global cell ID) and an ID of the gNB along with a C-mti used in the source cell and an ID of the source cell (Physical cell ID, global ID, etc.). The message may also be transmitted along with the information used in transmission to the current SN, e.g., SN terminated bearer information (EPS bearer ID, ERAB ID, drb ID, QoS information corresponding to SCG bearer (UE SN AMBR), security key, NCC, NH, security algorithm, etc.).

Upon receipt of the above information, the newly connected MN cell 40 may determine at step S225 whether the corresponding cell has a UE context. If the new MN cell 40 has the UE context, an operation subsequent to step S225 that has been described with reference to FIG. 1 may be performed. If not, an RRE reject message is transmitted such that the UE transitions to an idle mode.

If the new MN cell 40 succeeds in the UE context check, it transmits, at step S230, an RRC message including security and NAS-related configuration information to the new MN cell 40. Next, the UE 10 may perform a corresponding configuration and transmit a complete message at step S235. Afterward, the UE 10 and the new cell of the MN may establish SRB1 and SRB2.

After the SRB1 and SRB2 have been established, the new MN cell 40 may transmit, at step S240, an SN addition request to the gNB 30 as the SN supporting the corresponding cell using the SN cell ID, gNB id, and SCG RB information included in the RRE request. Upon receipt of the SN addition request, the SN 30 may perform a radio resource negotiation to transmit an ack or nack to the new MN cell 40 at step S245.

At step S243, the new MN cell 40 may communicate a PDU session path switch request with the core network AMF or UPF 50.

At step S250, the new MN cell 40 may transmit an RLF indication to the old MN cell 40. The SN addition request and RLF indication message may be transmitted in a reverse order. Upon receipt of the RLF indication, the old MN cell 20 may transmit an SN release command to the gNB 30 as the SN at step S255. Here, the SN addition gNB 30 may stop DL transmission. Upon receipt of the SN release message, the gNB may transmit to the new MN a message indicating that the SN has been released.

Upon receipt of the message indicating that the SN has been released, the new MN 40 may transmit, at step S260, to the UE an RRC connection reconfiguration message including the SCG configuration content included in the SN addition request ack message received at step S245. The RRC connection reconfiguration message may include the SCG configuration information used by the old SN 30 and a command providing instructs to release the DRB associated with the SCG. The new MN cell 40 may also instruct the UE 10 to perform an SCG configuration based on the newly received SCG configuration content. In this manner, it may be possible to release the old SCG configuration and apply the new SCG configuration information simultaneously. The SCG configuration information is the information obtained in response to the SN addition request made by the MN 40 based on the SCG/DRB information included in the RRE request. In this manner, the SN 30 may, if possible, become aware of the resource request from the old SN gNB 30 and allocate resources based on the resource request from the gNB 30 as the old SN.

The UE may reconnect, at step S265, to a cell of the corresponding SN through an RACH procedure and transmit, at step S270, an RRC connection reconfiguration complete message to the SN cell to resume data communication with the SN.

At step S275, the new MN cell 40 may communicate data with the core network AMF or UPF 50.

Embodiment 2

Figure 3:
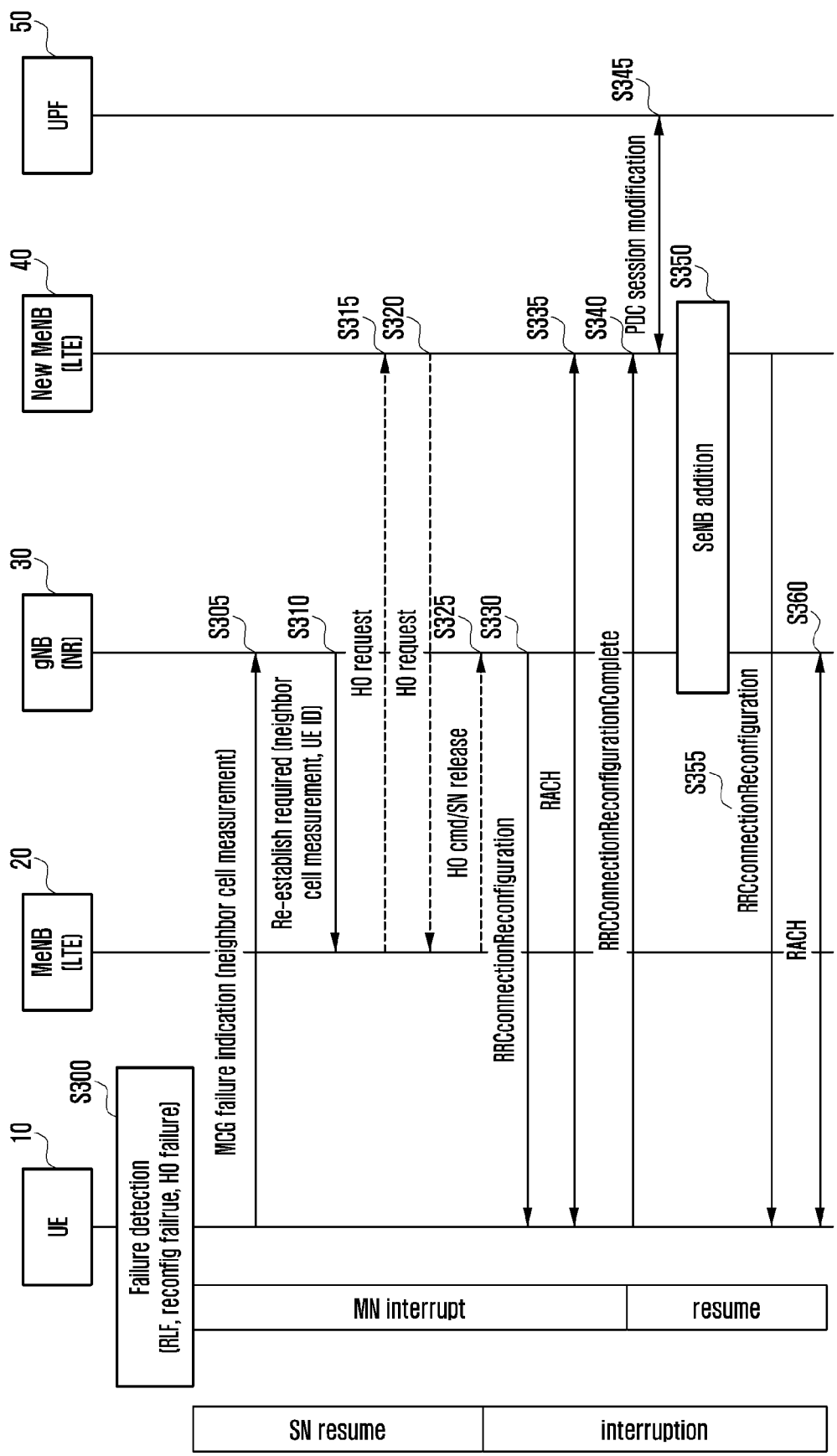
FIG. 3 is a signal flow diagram illustrating embodiment 2.

FIG. 3 is a signal flow diagram illustrating embodiment 2. As described in embodiment 1, upon detecting an MN failure at step S300, the UE 10 may first suspend the MCG RB. The UE 10 may also release the MC SCell. The UE 10 may also maintain the SCG configuration and DRB associated with the SCG. As a consequence, the UE 10 may connect to a new MN cell 40 while maintaining communication with the SN cell 30.

Upon detecting the MN failure, the UE 10 may transmit an MCG failure information to the SN gNB 30 over the SCG SRB at step S305. In this case, the SN gNB 30 may transmit a reestablishment required message including the information received from the UE to the MN eNB. The MCG failure indication may include serving and neighboring cell measurement results (cell IDs and measurement values) obtained through measurement in the MN cell 20. This information may be carried in the reestablishment required message transmitted to the MN cell 20 at step S310, and the message may further include a UE identifier such as UE ID or C-rnti and security information used in the MN such as shortMAC-I. Upon receipt of this message, the MN cell 20 may configure information to be included in a handover (HO) request using the measurement result and the UE identifier. At step S315, the MN 20 may transmit the HO request to the new cell 40 of the MN that is determined as having the best signal state. The HO request may include a target cell ID to be used in the new MN 40. The HO request may also include multiple cell IDs. The MN 40 may perform the HO to the corresponding cell for the case where a single target cell ID is included or determine a target cell among given cells of the new MN 40 for the case where multiple cell IDs are included. Upon receipt of the request, the new MN cell 40 transmits, at step S320, an ack for the case where the HO of the UE is acceptable as requested in the HO request or nack for the case were the HO of the UE is unacceptable. The new MN 40 may transmit to the old MN 20 an HO response including configuration information on the resources available in the new MN 40 in response to the HO request. Upon receipt of the resource configuration information, the MN 20 may transmit, at step S325, to the SN gNB 30 an HO command message including the UE configuration information acquired from the HO response message. At step S330, the SN gNB 30 may transmit an RRCConnectionReconfiguration message to the UE 10 over the SCG SRB (e.g., SCG RRC). At step S325, the old MN 20 may transmit an SN release command along with the HO command (cmd). The RRCConnectionReconfiguration being transmitted to the UE 10 immediately after the receipt of the SN release may include the SN release command. The SN release message may not be transmitted and, in this case, the gNB 30 may perform an SN release by itself after receiving an HO complete message from the new MN 40 that has received an RRCConnectionReconfigurationComplete message. The UE 10 may apply configuration for connecting to the new MN 40 with the target cell ID and cell access information (such as rach configuration) included in the RRCConnectionReconfiguration message. The RRCConnectionReconfiguration message may also include SCG configuration information and SN-related DRB configuration information. In this manner, it may be possible to stop using the SN-related connection being maintained after the old MN failure.

At step S335, the UE 10 may connect to the target cell of the new MN 40 through an RACH procedure. At step S340, the UE 10 may transmit RRCConnectionReconfiguration-Complete information to the target cell. The MN 40 of the target cell may perform an SN addition procedure at step S350 and transmit corresponding configuration information to the UE 10 over the MCG SRB of the new MN 40 at step S355, and the UE 10 may connect to the SN cell. At step S360, the UE may transmit a connection complete and configuration complete message to the SN cell 30 through an RACH procedure.

Afterward, the UE 10 may resume data communication with the SN addition cell 30.

Embodiment 3

Figure 4:
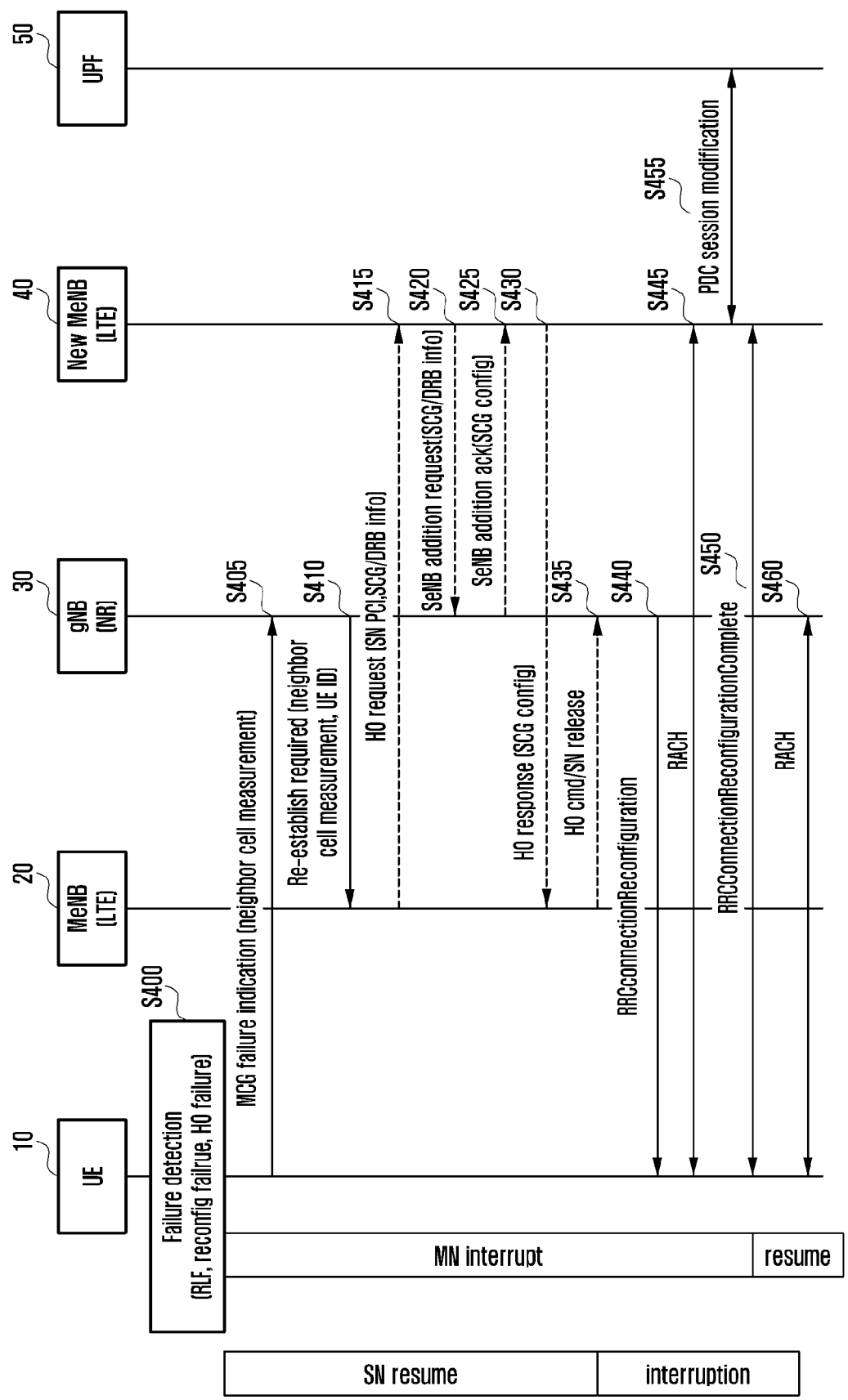
FIG. 4 is a signal flow diagram illustrating embodiment 3.

FIG. 4 is a signal flow diagram illustrating embodiment 3. As described in embodiment 1, upon detecting an MN failure at step S300, the UE 10 may first suspend the MCG RB. The UE 10 may also release the MC SCell. The UE 10 may also maintain the SCG configuration and DRB associated with the SCG. Accordingly, the UE 10 may connect to a new MN cell 40 while maintaining communication with the SN cell 300. This embodiment differs from embodiment 2 in that the UE 10 performs SN release and connection to a new SN cell simultaneously by way of performing the SN addition operation during the HO negotiation procedure (HO request-HO response) with the new MN cell 40 and including the SN release and new SCG configuration information in the RRCConnectionReconfiguration message being transmitted from the SN cell 30 to the UE.

In embodiment 3, upon detecting the MN failure, the UE 10 may transmit an MCG failure information to the SN gNB 30 over the SCG SRB at step S405, and the SN cell 30 may transmit a reestablishment required message including the MCG failure indication to the MN cell 20. The MCG failure indication may include serving and neighboring cell measurement results (cell IDs and measurement values) obtained through measurement in the MN cell 20. This information may be carried in the reestablishment required message transmitted to the MN cell 20, and the message may further include a UE identifier such as UE ID or C-RNTI. Upon receipt of this message, the MN cell 20 may configure information to be included in a handover (HO) request using the measurement result and the UE identifier and transmit, at step S415, the HO request to the new cell 40 of the MN that is determined as having the best signal state as a result of the measurement. The HO request may include a target cell ID. The HO request may also include a PCI used in the SN cell 30 and SCG info/SCG DRB information (e.g., EPS bearer ID, ERAB ID, drb ID, and QoS information corresponding to the bearer (UE SN AMBR, etc.)). Upon receipt of the HO request, the new MN cell 40 may transmit an ack for the case where the HO of the UE 10 is acceptable or a nack for the case where the HO of the UE 10 is unacceptable. During the HO negotiation by receiving an HO request message and transmitting an HO response message for the HO of the UE 10, the new MN cell 40 may acquire information on the SN cell 30 used along with the old MN cell 20 based on the SN PCI (cell ID) information included in the HO request message. Accordingly, the new MN cell 40 may transmit an SN addition request message at step S420 to request to the SN cell 30 used along with the old MN cell 20 for SN addition. In this case, the new MN cell 40 may request to the SN cell 30 for use of the SCG/DRB configuration information acquired from the HO request and, if the request is accepted, re-allocate radio resources guaranteeing the QoS level used in the old SN cell. If the SN cell 30 receives new SCG config, it may transmit an SN addition ack including the new SCG config to the new MN cell 40 at step S425. At step S430, the new MN cell 40 may transmit an HO response message including the SCG config to the old MN cell 30.

The HO response being transmitted from the new MN cell 40 to the old MN cell 20 in response to the HO request may include configuration information on the resources available in the new MN cell 40. Upon receipt of this information, the old MN cell 20 may transmit, at step S435, an HO cmd message including UE configuration information acquired from the corresponding HO response message to the SN gNB 20 that is in communication with the UE 10 (at this time, an SN addition release command may be transmitted as well). At step S440, the gNB 30 as the SN may transmit an RRCConnectionReconfiguration message to the UE 10 over the SCG SRB. The UE 10 may apply the configuration for connecting to the new MN cell 40 with the MN target cell ID and cell connection information (RACH configuration, etc.) included in the RRCConnectionReconfiguration message and configure SN radio information by applying the newly received SN-related SCG config. In this case, the UE 10 may remove the SN-related DRB configuration information and SCG configuration information to apply the configuration information of the newly received SCG config. At step S445, the UE may perform an RACH procedure for connecting to the target cell of the new MN 40. At step S450, the UE 10 may transmit RRCConnectionReconfigurationComplete information to the target cell of the new MN 40.

Meanwhile, at step S455, the new MN cell 40 may complete PDC session modification with the core network 50.

Afterward, at step S460, the UE 10 may perform an RACH procedure with the SN cell 30 based on the access information included in the new SCG config. Here, the RACH procedure with the SN cell 30 may be omitted. Afterward, the UE 10 may communicate data with the SN cell 30.

Embodiment 4

According to an alternative embodiment, an SN RRC message may be transmitted over an MCG SRB and an SCG SRB in a multi-RAT dual connectivity such as EN-DC. If an RRC message generated at an SN RRC entity is a request message requiring a response, a UL path for the SN RRC response message corresponding to the SN RRC request message may be indicated. This embodiment directs to a method for a UE to transmit an SN RRC message. In order to indicate the UL path, the SNR RRC message may include a 1-bit UL path indicator. This 1-bit indicator may indicate whether the SN RRC response message should be transmitted over the SCG SRB or the MCG SRB.

Figure 5:
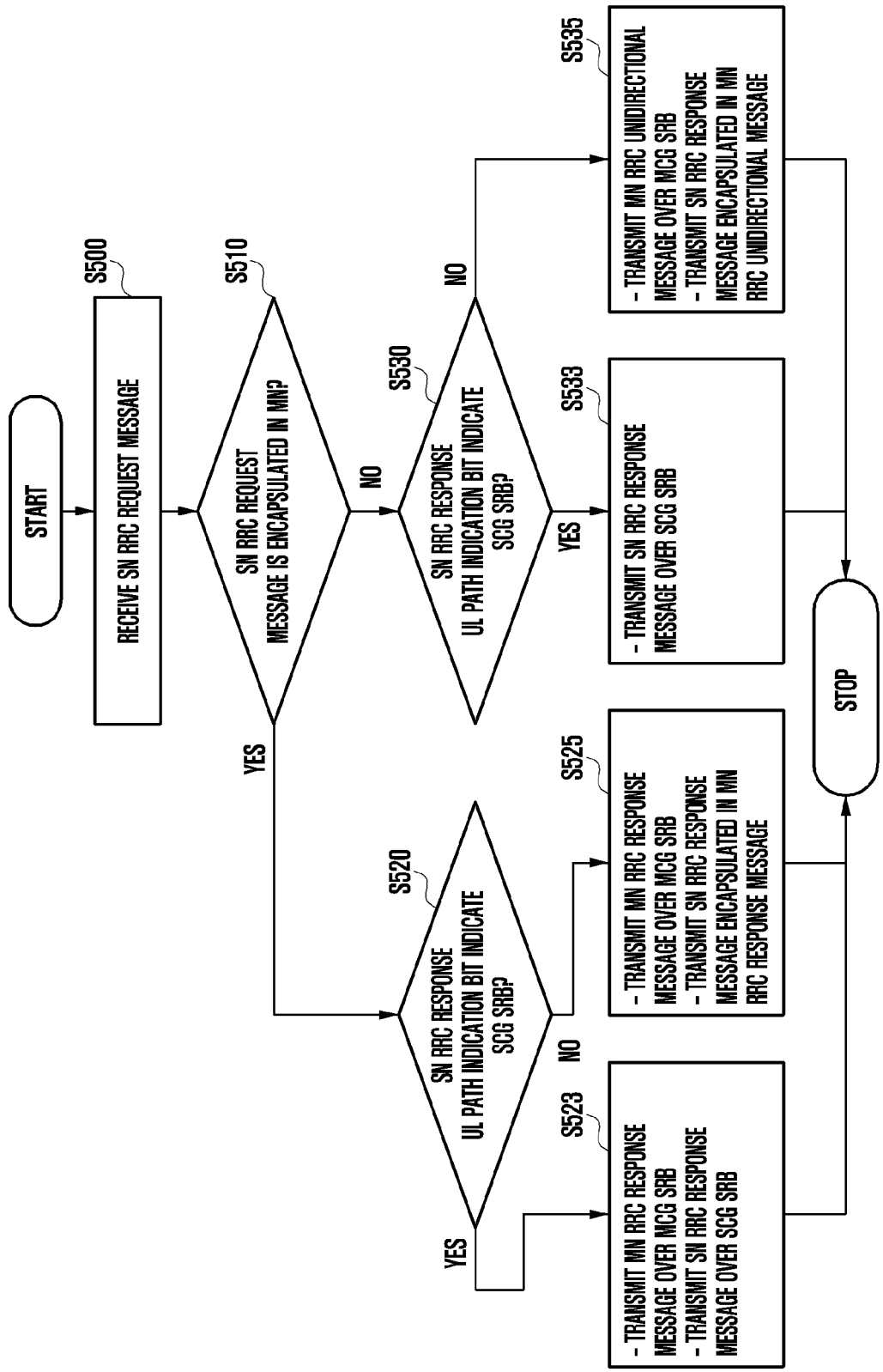
FIG. 5 is a flowchart illustrating embodiment 4 of the disclosure.

FIG. 5 is a flowchart illustrating embodiment 4 of the disclosure.

At step S500, a UE may receive an SN RRC request message. The UE may determine whether to transmit an SN RRC response message, which is encapsulated in an MN RRC message, over an MCG SRB or an SCG SRB based on the path on which the SN RRC request message is received and a UL path indication bit included in the SN RRC request message.

For example, at step S510, the UE may determine whether the received SN RRC request message is encapsulated in an MN. If it is determined that the SN RRC request message is encapsulated in the MN, the UE may determine at step S520 whether the SN RRC response UL path indication bit indicates an SCG SRB. If it is determined that the SN RRC response UL path indication bit indicates an SCG SRB, the UE may transmit, at step S523, an MN RRC response message over the MCG SRB and an SN RRC response message over the SCG SRB. If it is determined that the SN RRC response UL path indication bit indicates an MCG SRB, the UE may transmit, at step S525, the MN RRC response message over the MCG SRB in which the SN RRC response message is encapsulated.

If it is determined at step S510 that the SN RRC request message is not encapsulated in an MN, i.e., if the SN RRC request message is directly transmitted over the SCG SRB, the UE may determine at step S530 whether the SN RRC response UL path indication bit indicates an SCG SRB. If it is determined that the SN RRC response UL path indication bit indicates an SCG SRB, the UE may transmit the SN RRC response message over the SCG SRB at step S533. If it is determined that the SN RRC response UL path indication bit does not indicate an SCG SRB, the UE may transmit an MN RRC unidirectional message over the MCG SRB at step S535. In this case, the UE may encapsulate the SN RRC response message in the MN RRC unidirectional message.

In summary, 1. if the received SN RRC request message is encapsulated in the MN RRC message, the UE may decapsulate the MN RRC message to obtain the SN message and, if the UL path indicator indicates an SCG SRB, transmit the MN RRC response message over the MCG SRB and generate a separate SN RC response message and transmit the SN RRC response message over the SCG SRB. In this case, transmitting the MN RRC response message may be omitted;

2. if the received SN RRC request message is encapsulated in the MN RRC message, the UE may decapsulate the MN RRC message to obtain the SN RRC message and, if the UL path indicator indicates an MCG SRB, generate and transmit an MN RRC response message encapsulating the SN RRC response message over the MCG SRB; upon receipt of this message, the MN may decapsulate the MN RRC response message to obtain the SN RRC response message and transmit the SN RRC response message, as an inter-node message, to the SN;

3. if the SN RRC request message is directly received over the SCG SRB and the UL path indicator indicates an SCG SRB, the UE may directly transmit the SN RRC response message to the SN over the SCG SRB;

if the MN receives the RRC message from the SN, it may transmit an MN RRC message encapsulating the RRC message received from the SN; if the MN receives the MN RRC response message from the UE, it may determine whether an SN message is encapsulated in the MN RRC response message and, if so, transmit the SN message to the SN through an Xn interface and, if not, transmit no SN message;

4. if the SN RRC request message is directly received over the SCG SRB and the UL path indicator indicates an MCG SRB, the UE may generate an MN RRC unidirectional message encapsulating the SN RRC response message and transmit the MN RRC unidirectional message over the MCG SRB; upon receipt of this message, the MN decapsulate the MN RRC unidirectional message to obtain the SN RRC response message and transmit the SN RRC response message, as an inter-node message, to the SN.

Figure 6:
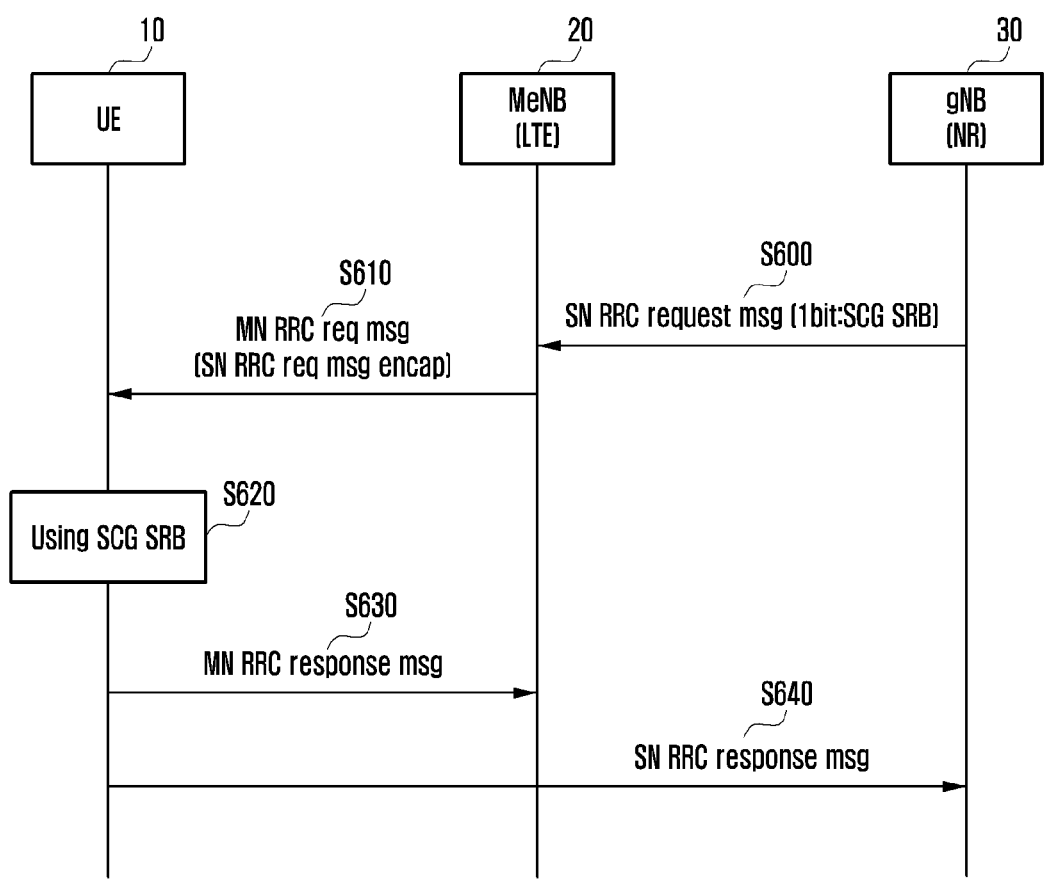
FIG. 6 is a signal flow diagram illustrating case 1 in embodiment 4.

FIG. 6 is a signal flow diagram illustrating case 1. At step S600, the SN cell 30 may transmit to the MN cell 20 an SN RRC request message including the SN RRC response UL path indication bit indicating an SCG SRB. At step S610, the MN cell 20 may transmit to the UE 10 an MN RRC request message encapsulating the SN RRC request message. As described above, the UE 10 may check the SN RRC response UL path indication bit. If the SN RRC response UL path indication bit indicates SCG SRB, the UE may determine, at step S620, to transmit the SN RRC message over the SCG SRB. As a consequence, the UE may transmit, at step S630, an MN RRC response message over the MCG SRB and, at step S640, an SN RRC response message over the SCG SRB.

Figure 7:
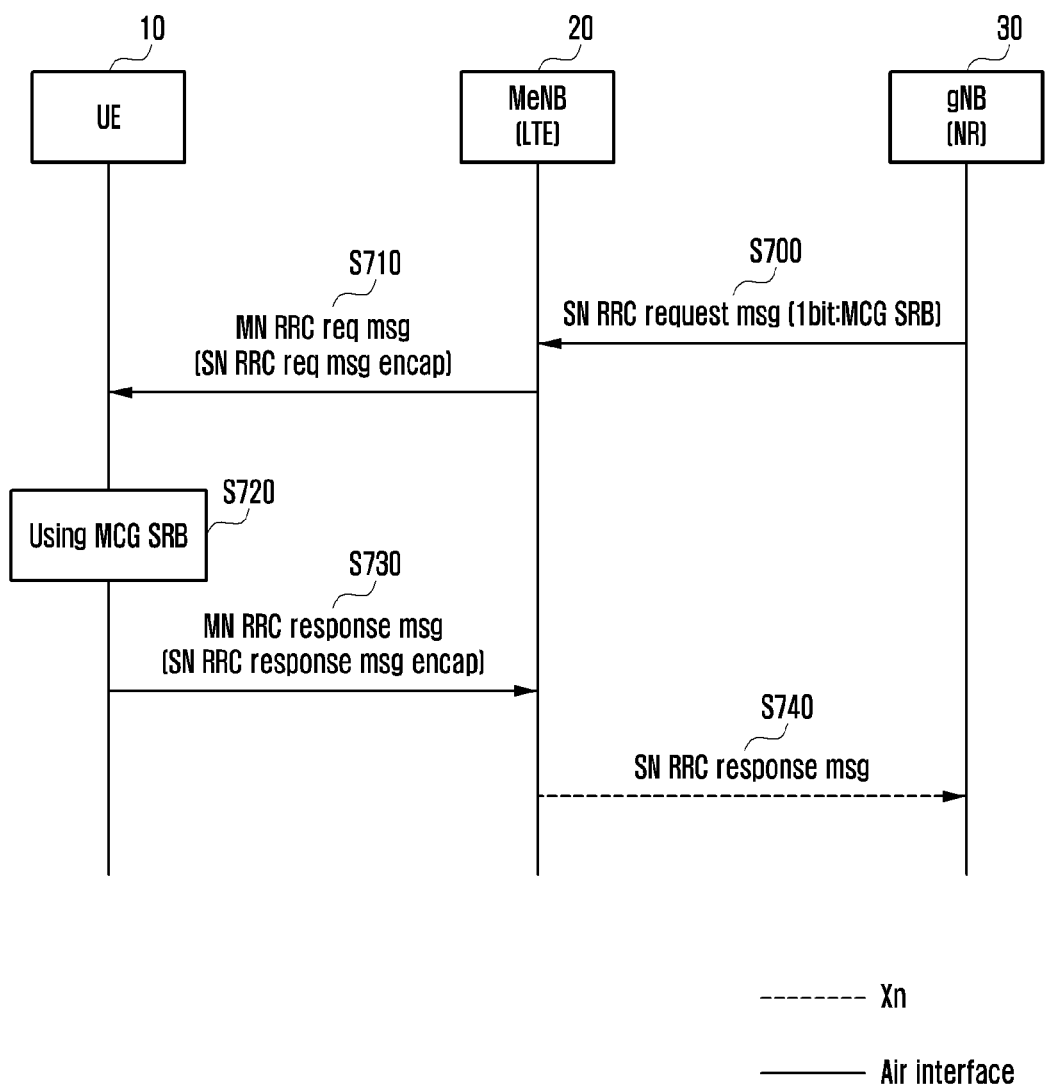
FIG. 7 is a signal flow diagram illustrating case 2 in embodiment 4.

FIG. 7 is a signal flow diagram illustrating case 2. As in the embodiment of FIG. 6, an SN cell 30 may transmit an SN RRC request message to an MN cell 30 at step S700. In the embodiment of FIG. 7, the SN RRC response UL path indication bit may indicate an MCG SRB. At step S710, the MN cell 20 may transmit to a UE 10 an MN RRC request message encapsulating the SN RRC request message. The UE 10 may check the SN RRC response UL path indication bit. If it is determined that the SN RRC response UL path indication bit indicates an MCG SRB, the UE 10 may determine, at step S720, to transmit the SN RRC response message over the MCG SRB. In this case, the UE 10 may transmit the MN RRC response message over the MCG SRB. The MN cell 20 may decapsulate the MN RRC response message to obtain the SN RRC response message and transmit the SN RRC response message, as an inter-node message, to the SN at step S740.

Figure 8:
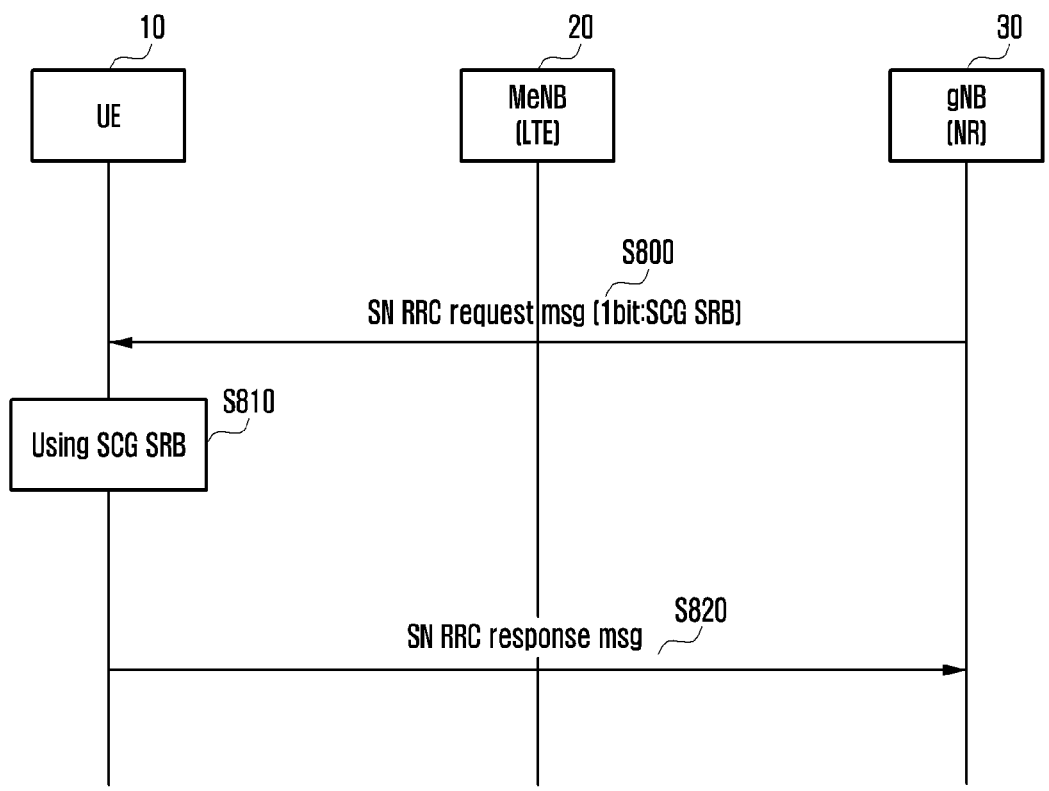
FIG. 8 is a signal flow diagram illustrating case 3 in embodiment 4.

FIG. 8 is a signal flow diagram illustrating case 3. In the embodiment of FIG. 8, the UE 10 may receive an SN RRC request message from the SN cell 30 over an SCG SRB at step S800. If the SN RRC request message includes a UL path indication_indicating an SCG SRB, the UE 10 may determine at step S810 to use an SCG SRB. At step S820, the UE 10 may directly transmit an SN RRC response message to the SN over the SCG SRB.

Figure 9:
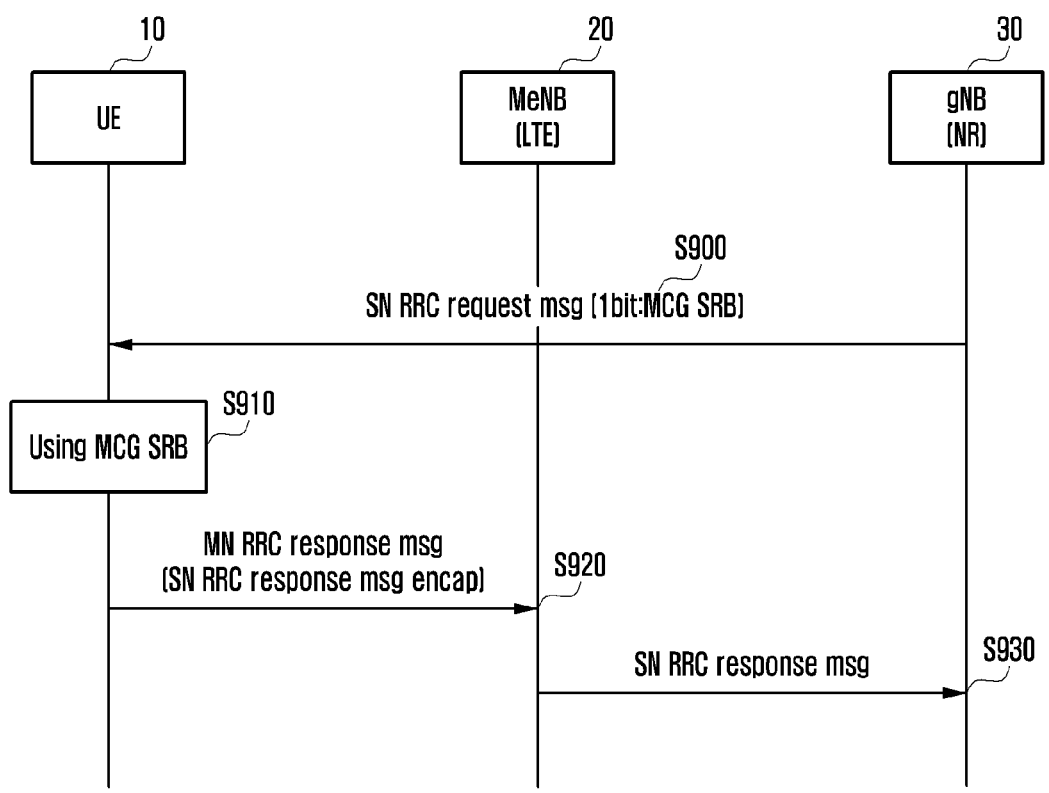
FIG. 9 is a signal flow diagram illustrating case 4 in embodiment 4.

FIG. 9 is a signal flow diagram illustrating case 4. In the embodiment of FIG. 9, the UE 10 may receive an SN RRC request message from the SN cell 30 over an SCG SRB at step S900. If the SN RRC request message includes a UL path indication indicating an MCG SRB, the UE 10 may determine at step S910 to use an MCG SRB. As a consequence, the UE 10 may generate an MN RRC unidirectional message including an SN RRC response message and transmit the MN RRC unidirectional message over the MCG SRB at step S920. Upon receipt of this message, the MN cell 20 may decapsulate the MN RRC unidirectional message to obtain the SN RRC response message and transmit the SN RRC response message, as an inter-node message, to the SN cell 30 at step S930.

Embodiment 5

According to an alternative embodiment, an SN measurement report may be configured based on measConfig included in an SN RRC connection reconfiguration message. In this case, in addition to the UL path indication bit included in the RRCConnectionReconfigurationComplete message being transmitted in response to an SN RRCConnectionReconfiguration message, another 1-bit indication may be configured in a measConfig IE for indicating whether to use an MCG SRB or SCG SRB path for transmitting an measurement report message upon occurrence of a corresponding event. In the case where the above indication is transmitted via the SN RRC message, the UE may select one of SCG and MCG SRBs for transmitting the SN RRCConnectionReconfigurationComplete message in response to the SN RRCConnectionReconfiguration message based on the UL path indication information as described in embodiment 4. Simultaneously, the UE may transmit, when the event occurs, a measurement report (MR) on the corresponding UL path indicated by the MR UL path indication bit in the measConfig IE. For example, the UE may transmit the MR over the SCG SRB for the case where the MR UL path indication bit indicates an SCG SRB or transmit an MN RRC response message or a unidirectional message encapsulating the MR to the MN for the case where the MR UL path indication bit indicates an MSG SRB. The MN may transmit only the received MR to the SN.

Figure 10:
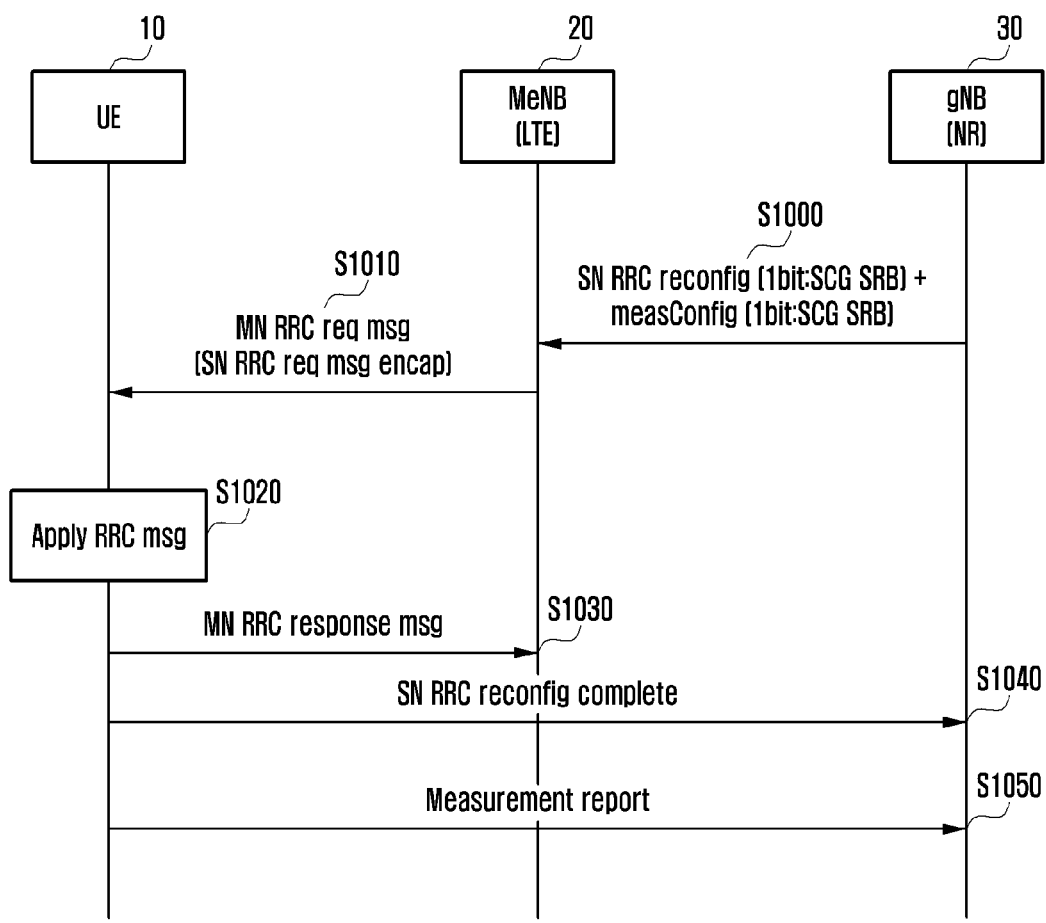
FIG. 10 is a signal flow diagram illustrating a procedure for transmitting both an SN RRCConnectionReconfigurationComplete message and an MR over an SCG SRB according to an embodiment.

FIG. 10 is a signal flow diagram illustrating a procedure for transmitting both an SN RRCConnectionReconfigurationComplete message and an MR over an SCG SRB according to an embodiment.

First, at step S1000, an SN cell 30 may transmit to an MN cell 20 an SN RRC Connection Reconfiguration message including an RRCConnectionReconfigurationComplete-related UL path indication bit and an MR UL path indication bit of a measConfig IE that are both set to indicate an SCG SRB. At step S1010, the MN cell 20 may transmit to a UE 10 an MN RRC request message encapsulating an SN RRC request message. The UE 10 may check the RRCConnectionReconfigurationComplete-related UL path indication bit and the MR UL path indication bit of the measConfig IE.

As a result of the check, if both the indication bits indicate an SCG SRB, the UE 10 may determine to transmit the SN RRCConnectionReconfigurationComplete message and the MR over an SCG SRB.

Figure 11:
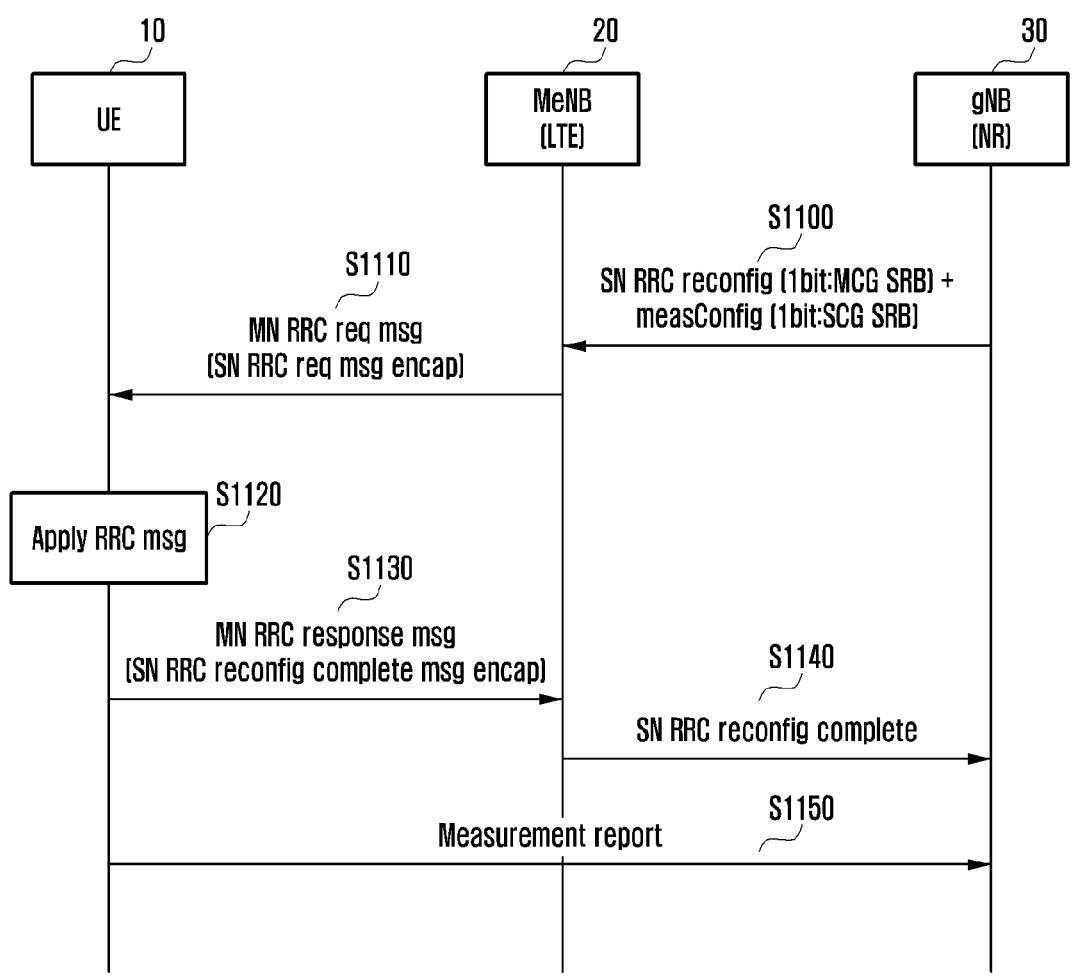
FIG. 11 is a signal flow diagram illustrating a procedure for transmitting an SN RRCConnectionReconfigurationComplete message over an MCG SRB and an MR over an SCG SRB according to an embodiment.

As a consequence, the UE 10 transmits an MN RRC response message to the MN cell 20 at step S1030 and the SN RRCConnectionReconfigurationComplete message to the MR at steps S1040 and S1050 over the SCG SRB. FIG. 11 is a signal flow diagram illustrating a procedure for transmitting an SN RRCConnectionReconfigurationComplete message over an MCG SRB and an MR over an SCG SRB according to an embodiment. At step S1100, an SN cell 30 may transmit to an MN cell 20 an SN RRC connection reconfiguration message including an RRCConnectionReconfigurationComplete-related UL path indication bit set to indicate an MSG SRB and an MR UL path indication bit of a measConfig IE that is set to indicate an SCG SRB. At step S1110, the MN cell 20 may transmit to a UE 10 an MN RRC request message encapsulating an SN RRC request message. The UE 10 may check the RRCConnectionReconfiguration-Complete-related UL path indication bit and the MR UL path indication bit of the measConfig IE.

At step S1120, the UE may determine a path for transmitting an RRC message based on a result of the check.

Figure 12:
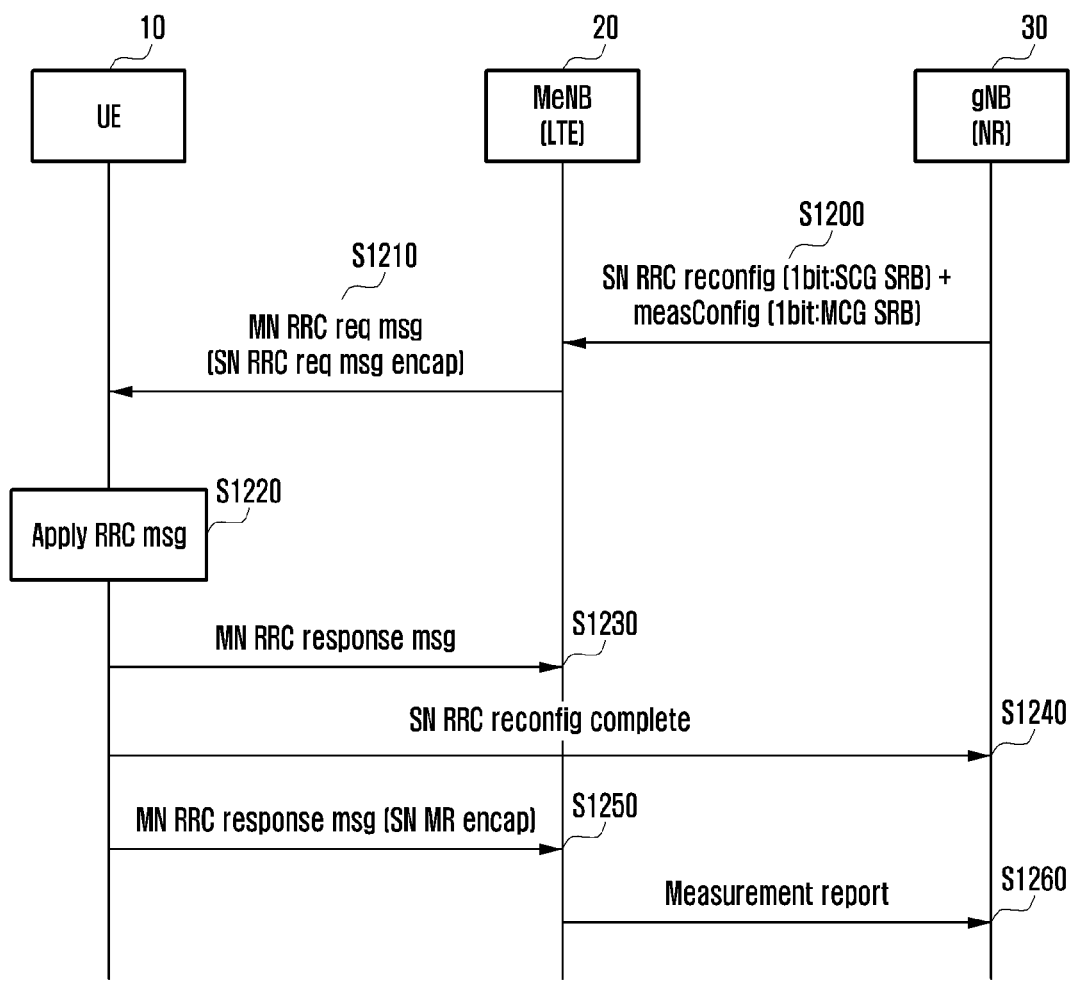
FIG. 12 is a signal flow diagram illustrating a procedure for transmitting an SN RRCConnectionReconfigurationComplete message over an SCG SRB and an MR over an MCG SRB.

In detail, the UE 10 may transmit an MN RRC response message to the MN cell 20 at step S1130. In this case, the MN RRC response message being transmitted to the MN cell 20 may encapsulate the SN RRCConnectionReconfigurationComplete message. Accordingly, the MN cell 20 may transmit the SN RRCConnectionReconfigurationComplete message to the SN cell 30 at step S1140. At step S1150, the UE 10 may transmit an MR to the SN cell 30 over the SCG SRB. FIG. 12 is a signal flow diagram illustrating a procedure for transmitting an SN RRCConnectionReconfigurationComplete message over an SCG SRB and an MR over an MCG SRB. At step S1200, the SN cell 30 may transmit to an MN cell 20 an SN RRC connection reconfiguration message including an RRCConnectionReconfigurationComplete-related UL path indication bit set to indicate an SCG SRB and an MR UL path indication bit of a measConfig IE that is set to indicate an MCG SRG. At step S1210, the MN cell 20 may transmit to a UE 10 an MN RRC request message encapsulating an SN RRC request message. The UE 10 may check the RRCConnectionReconfigurationComplete-related UL path indication bit and the MR UL path indication bit of the measConfig IE.

At step S1220, the UE 10 may determine a path for transmitting an RRC message based on a result of the check.

Figure 13:
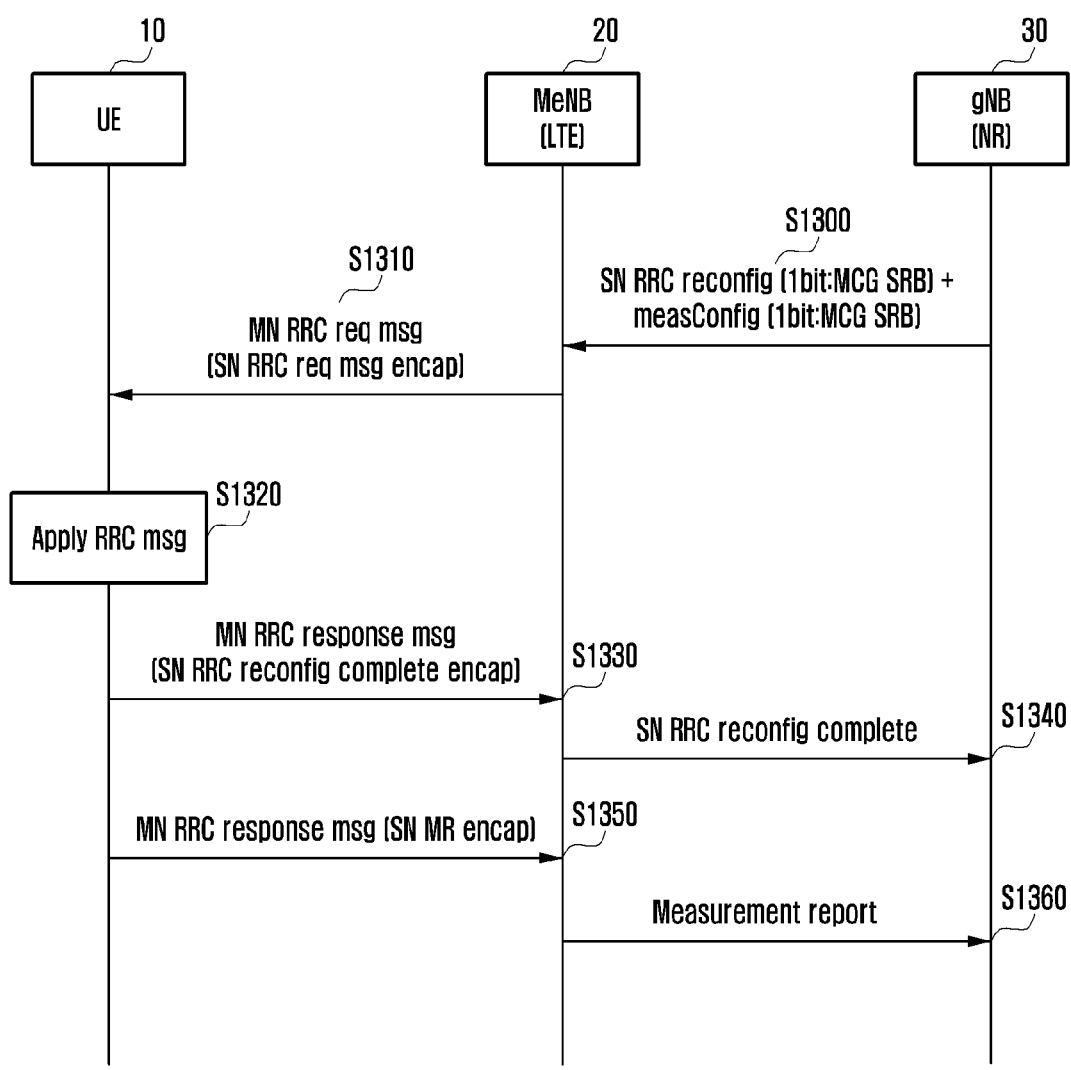
FIG. 13 is a signal flow diagram illustrating a procedure for transmitting both an SN RRCConnectionReconfigurationComplete and an MR over an MCG SRB.

In detail, the UE 10 may transmit an MN RRC response message to the MN cell 20 at step S1230. At step S1240, the UE 10 may transmit the SN RRCConnectionReconfigurationComplete message to the SN cell 30 over the SCG SRB. At step S1250, the UE 10 may transmit to the MN cell 20 an MN RRC response message including the MR over the MCG SRB. The MN cell 20 may transmit a decapsulated MR to the SN cell 30 at step S1260. FIG. 13 is a signal flow diagram illustrating a procedure for transmitting both an SN RRCConnectionReconfigurationComplete and an MR over an MCG SRB. At step S1300, an SN cell 30 may transmit to an MN cell 20 an SN RRC connection reconfiguration message including an RRCConnectionReconfigurationComplete-related UL path indication bit and an MR UL path indication bit of a measConfig IE that are both set to indicate an MCG SRB. At step S1310, the MN cell 20 may transmit to a UE 10 an MN RRC request message encapsulating an SN RRC request message. The UE 10 may check the RRCConnectionReconfigurationComplete-related UL path indication bit and the MR UL path indication bit of the measConfig IE.

As a result of the check, if both the indication bits indicate an MCG SRB, the UE 10 may determine, at step S1320, to transmit both the SN RRCConnectionReconfigurationComplete message and the MR over the MCG SRB.

Accordingly, at step S1330, the UE 10 may transmit an MN RRC response message to the MN cell 20. In this case, the MN RRC response message being transmitted to the MN cell 20 may encapsulate the SN RRCConnectionReconfigurationComplete message. Accordingly, the MN cell 20 may transmit the SN RRCConnectionReconfigurationComplete message to the SN addition cell 30 at step S1340.

Figure 14:
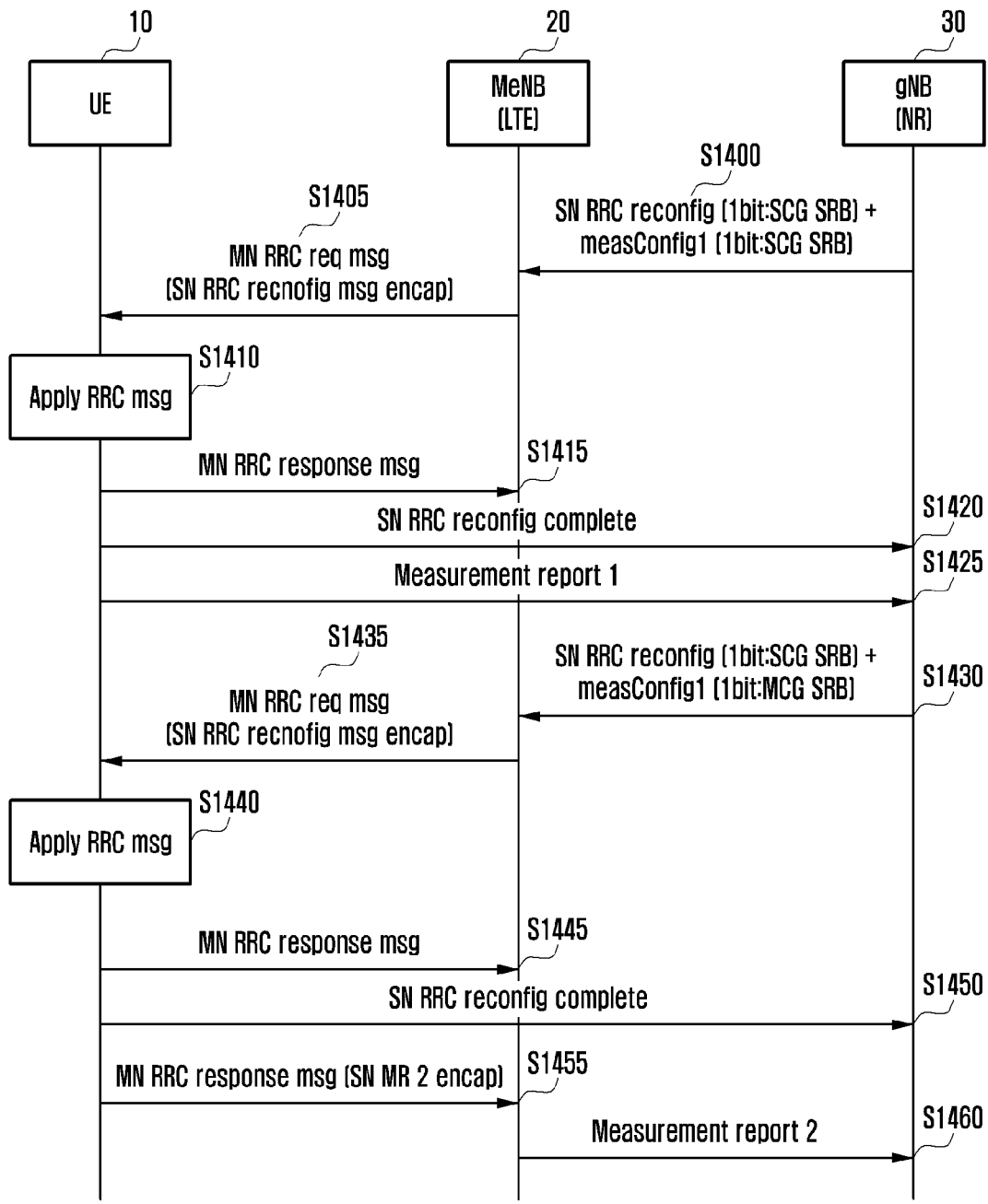
FIG. 14 is a signal flow diagram illustrating a procedure for transmitting SN RRCConnectionReconfigurationComplete messages and MRs for a situation where multiple measConfig IEs indicating different MR UL paths are transmitted in respective RRCConnectionReconfiguration messages.

At step S1350, the UE 10 may also transmit to the MN cell 20 an MN RRC response message including the MR over the MCG SRB. At step S1360, the MN cell 20 may decapsulate the MR and transmit the MR to the SN cell 30. FIG. 14 is a signal flow diagram illustrating a procedure for transmitting SN RRCConnectionReconfigurationComplete messages and MRs for a situation where multiple measConfig IEs indicating different MR UL paths are transmitted in respective RRCConnectionReconfiguration messages. The MR configured in each measConfig may be transmitted through a UL path that is independently configured.

In detail, at step S1400, an SN cell 30 may transmit to an MN cell 20 an SN RRC connection reconfiguration message including an RRCConnectionReconfigurationComplete-related UL path indication bit and an MR UL path indication bit of a first meaConfig IE that are both set to indicate an SCG SRB. At step S1405, the MN cell 20 may transmit to a UE 10 an MN RRC request message encapsulating an SN RRC reconfiguration message. The UE 10 may check the RRCConnectionReconfigurationComplete-related UL path indication bit and the MR UL path indication bit of the measConfig IE.

As a result of the check, if both the indication bits indicate an SCG SRB, the UE 10 may determine at step S1410 to transmit the SN RRCConnectionReconfigurationComplete and the MR over the SCG SRB.

Accordingly, the UE 10 transmits to the MN cell 20 an MN RRC response at step S1415 and an SN RRCConnectionReconfigurationComplete message and a first MR at steps 1420 and 1425 over the SCG SRB.

At step S1430, the SN cell 30 may transmit to the MN cell 20 an SN RRC connection reconfiguration message including an RRCConnectionReconfigurationComplete-related UL path indication bit set to indicate an SCG SRB and an MR UL path indication bit of a measConfig IE. At step S1435, the MN cell 20 may transmit to the UE 10 an MN RRC request message encapsulating an SN RRC request message. The UE 10 may check the RRCConnectionReconfigurationComplete-related UL path indication bit and the MR UL path indication bit of the measConfig IE.

The UE 10 may determine at step S1440 a path for transmitting an RRC message based on a result of the check.

In detail, the UE 10 may transmit an MN RRC response message to the MN cell at step S1445. At step S1450, the UE 10 may transmit the SN RRCConnectionReconfigurationComplete message to the SN cell 30 over the SCG SRB. At step S1455, the UE may transmit to the MN cell 20 an MN RRC response message including a second MR. The MN cell 20 may decapsulate the second MR and transmit the MR to the SN cell 30 at step S1460.

Embodiment 6

According to an alternative embodiment, a UL path of an MR for an SN may be configured per measID in a measConfig, although it can be configured per measConfig IE included in an RRCConnectionReconfiguration. In this case, an SN RRCConnectionReconfigurationComplete-related UL path indication bit and per-measID MRUL path indication bit of the measConfig IE may be included in an SN RRCConnectionReconfiguration message. The UE may check the per-measID MR UL path indication of the SN RRCConnectionReconfiguration message to transmit, if a per-MeasID event occurs, a corresponding MR on the configured UL path.

Figure 15:
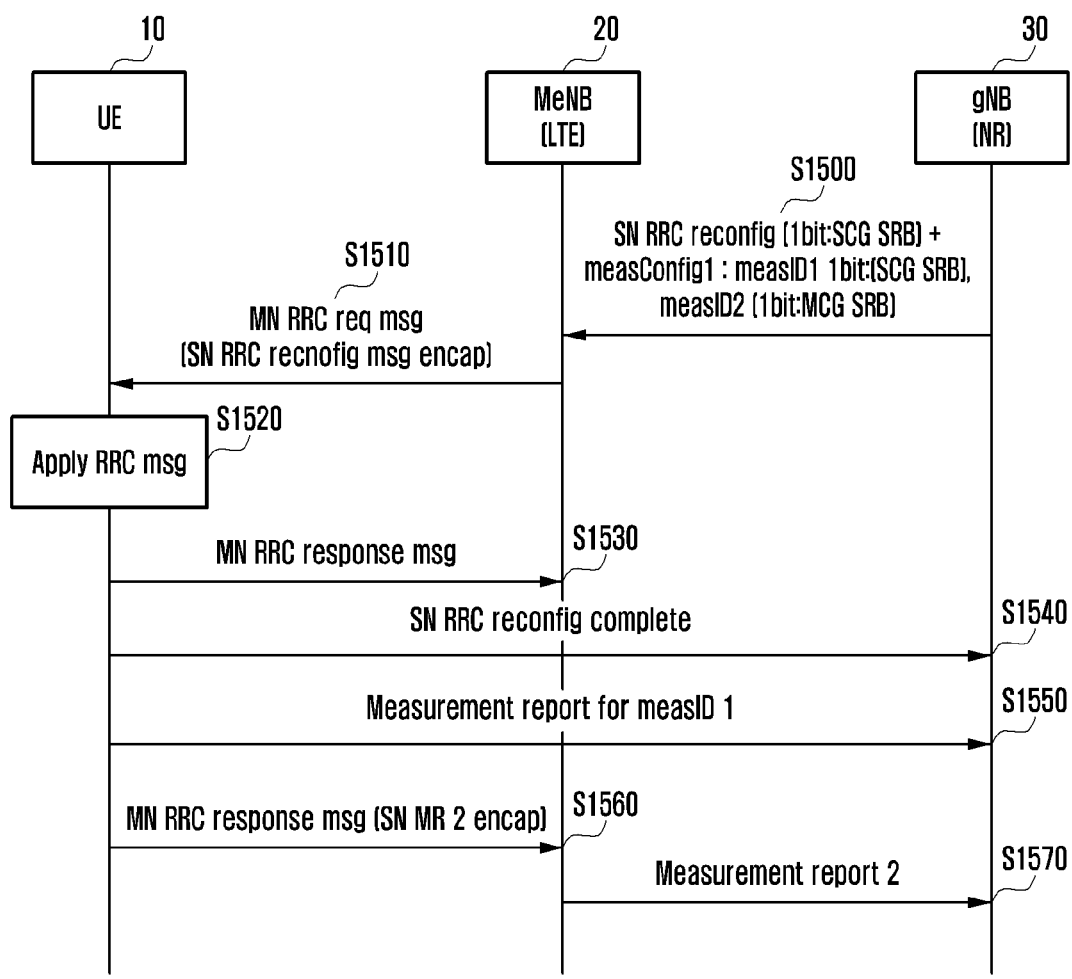
FIG. 15 is a signal flow diagram illustrating embodiment 6.

Embodiment 6 is described in detail with reference to FIG. 15. At step S1500, the SN cell 30 may transmit to an MN cell 20 an SN RRC connection reconfiguration message including an RRCConnectionReconfigurationComplete-related UL path indication bit set to indicate an SCG SRB, an MR UL path indication bit for a first measID that is set to indicate an SCG SRB in the measConfig IE, and an MR UL path indication bit for a second measID that is set to indicate an MCG SRB in the measConfig IE. At step S1510, the MN cell 20 may transmit to a UE 10 an MN RRC request message encapsulating the SN RRC reconfiguration message. The UE 10 may check the UL path indication bit and MR UL path indication bits for the first and second measIDs of the measConfig IE. At step S1520, the UE may determine to transmit the SN RRCConnectionReconfigurationComplete message and the MR corresponding to the first measID over the SCG SRB. The UE 10 may also determine to transmit the MR corresponding to the second measID over the MCG SRB.

Accordingly, the UE 10 may transmit an MN RRC response message to the MN cell at step S1530 and the SN RRCConnectionReconfigurationComplete message and the first MR over the SCG SRB at steps S1540 and S1550.

At step S1560, the UE 10 may transmit an MN RRC response message including the second MR to the MN cell 20 over the MCG SRB. At step S1570, the MN cell 20 may decapsulate the second MR and transmit the second MR to the SN cell 30 at step S1750.

For example, if the SN cell uses a carrier frequency in an mmW band, it may always configure an MCG SRB for an MR UL path. If it is determined that a link quality is very poor based on a link status of the SN cell (an average level of RSRP that is received from the UE or measured on an SRS or an average number of HARQ retransmissions), the SN cell may configure an MCG SRB for the MR UL path.

The SN RRC request message may be any of all types of messages being transmitted by an SN RRC and requiring a one-time response from the UE, and the SN RRC response message may be a response message transmitted by the UE in reply. Examples of the request and response messages are as follows:

| | |
|---|---|
| CounterCheck | CounterCheckResponse |
| RRCConnectionReconfiguration | |
| | RRCConnectionReconfigurationComplete |
| RRCConnectionResume | RRCConnectionResumeComplete |
| SecurityModeCommand | SecurityModeComplete, SecurityModeFailure |
| UECapabilityEnquiry | UECapabilityInformation |
| UEInformationRequest | UEInformationResponse |

There may be other one-time messages being transmitted by the SN RRC in DL and the UE in UL. A one-time DL message may be immediately transmitted on an MCG SRB or SCG SRB that is autonomously selected by the SN RRC, and each one-time UL SN RRC message may be transmitted over a default SRB designated for a default SN. The default SRB may be selected among MCG and SCG SRBs and notified to the UE via system information.

Accordingly to an alternative embodiment, an SCG change indication indicating a necessary operation or a use case requiring the corresponding operation may be transmitted to the SN or MN.

Allowing the NR PDCP to be used in the LTE user plane makes it possible to reset each layer 2 stack in part in the case where legacy synchronization reconfiguration operations (e.g., UE performs MAC and RLC reset, PDCP reestablishment for SCG, and RACH procedure to target SCG) are performed all together in association with PDCP version change, PDCP anchor point change, security Key refresh, etc. of the bearers being used in an SCG. In this regard, it may be possible to indicate any partially required synchronization reconfiguration operation or corresponding use case in an SCG change IE of an SCG change message such that the SN prepares for the corresponding operation, thereby reducing latency.

Figure 16A:
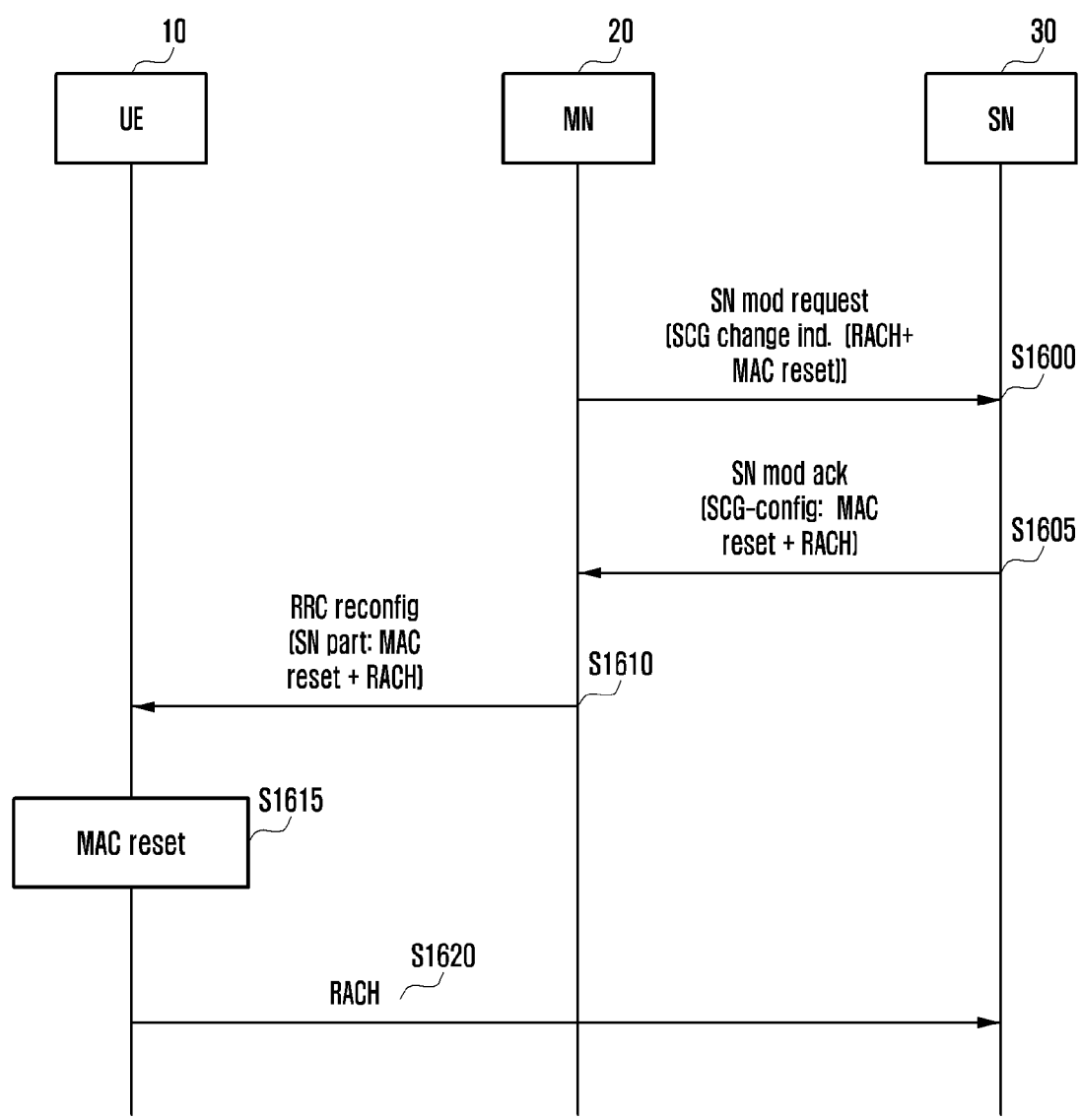
FIGS. 16A to 16C are signal flow diagrams illustrating MN-initiated SCG change procedures according to various embodiments.
Figure 16B:
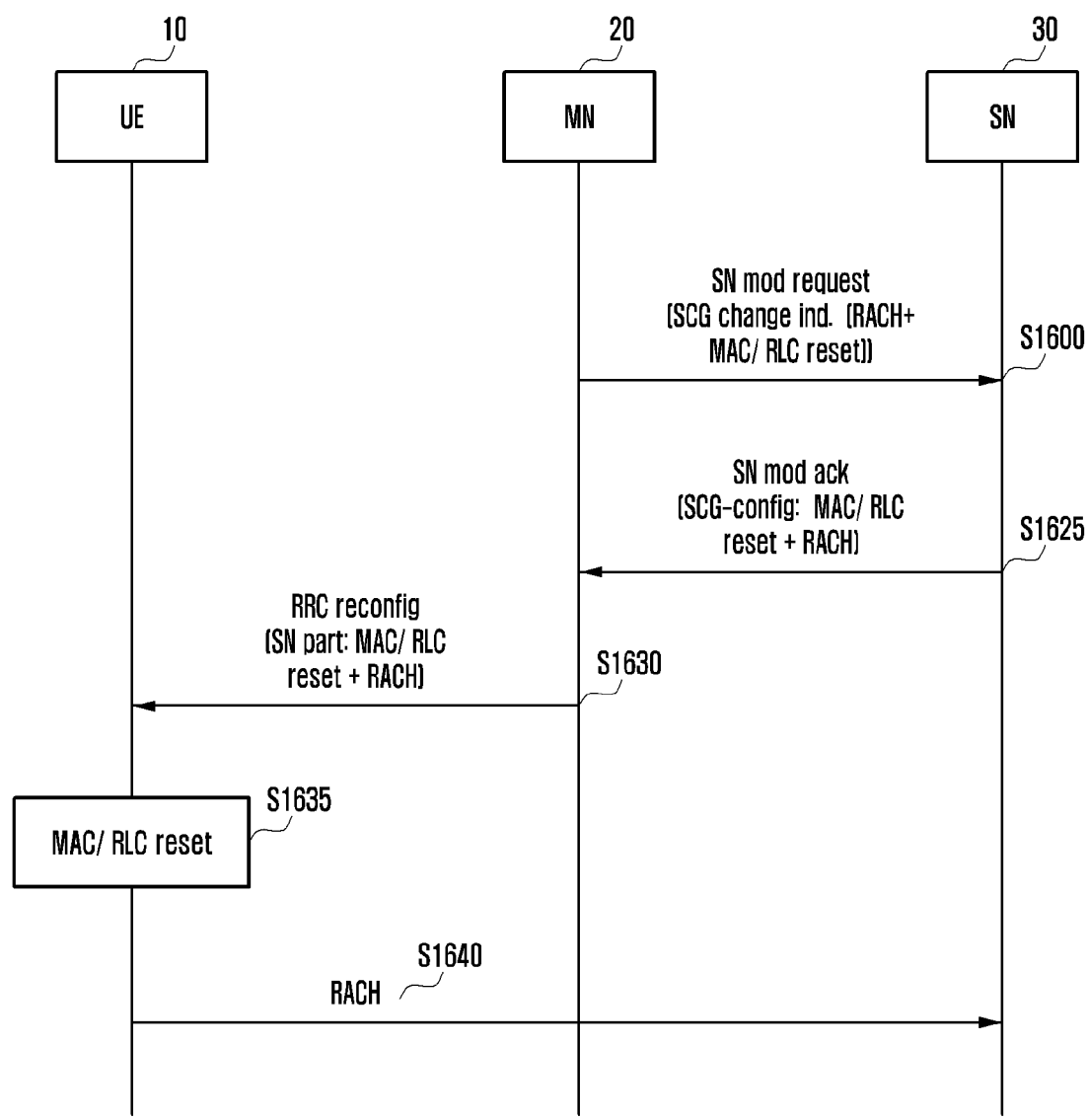
Figure 16C:
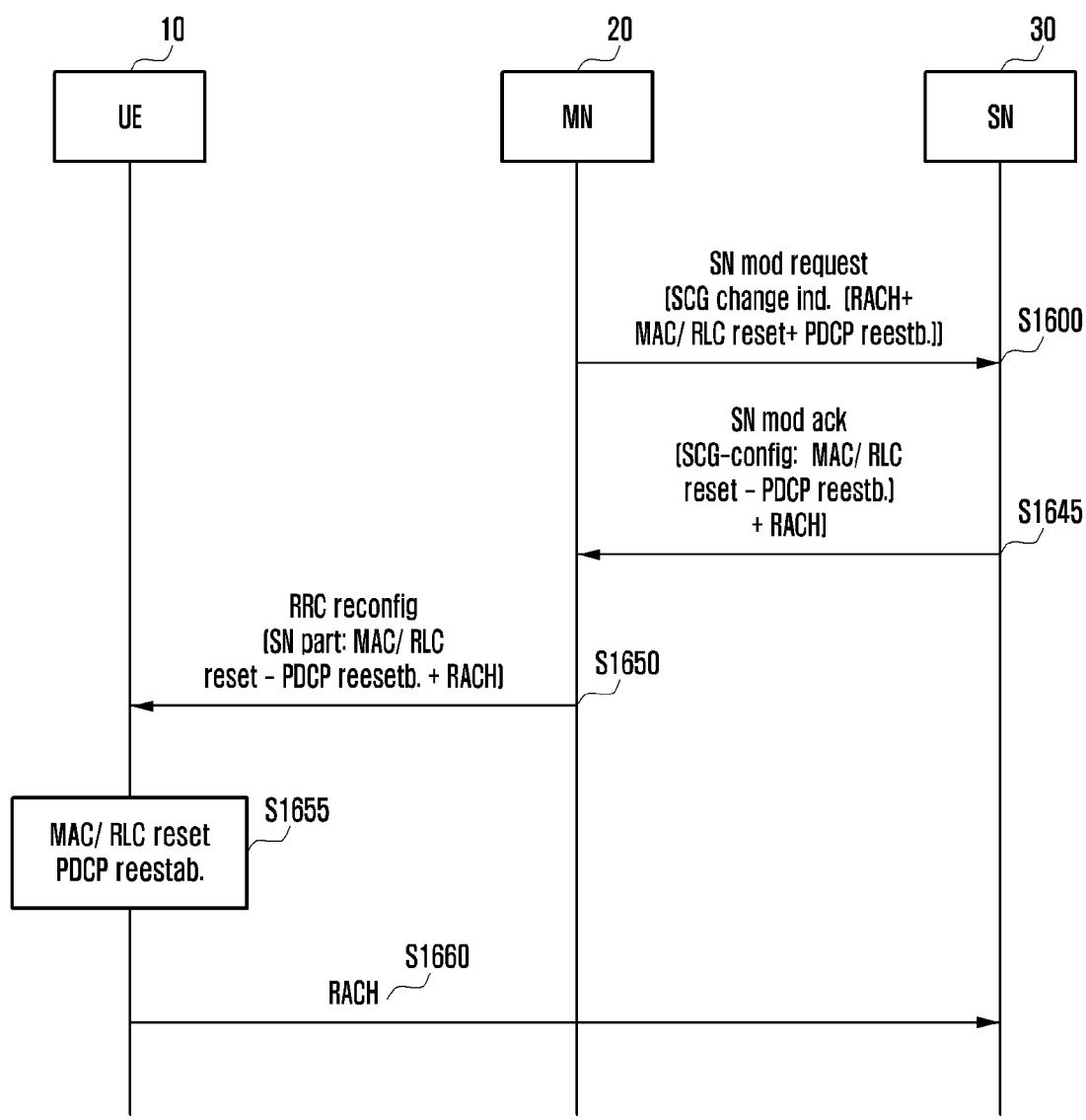

FIGS. 16A to 16C are signal flow diagrams illustrating MN-initiated SCG change procedures according to various embodiments.

First, an MN 20 may transmit, at step S1600, an SN modification request message including an SCG change indicator to an SN 30 to notify the SN 30 of an operation necessary for synchronous reconfiguration. The necessary operation is as follows: security key refresh, reconfiguration, RACH, RACH and MAC reset, RACH and MAC reset and RLC reset, and RACH and MAC reset and RLC reset and PDCP reestablishment. Upon receipt of the above message, the SN 30 may perform an SN side operation for the necessary operation. For example, for a normal reconfiguration rather than a sublayer reset of an L2 stack, the SN may perform the corresponding reconfiguration and, if the message indicates RACH, monitor an RACH for a random access preamble from the corresponding UE.

As shown in FIG. 16A, if the RACH and MAC reset is indicated as the operation necessary for synchronous reconfiguration, the SN 30 may reset its MAC associated with the corresponding UE. Afterward, the SN 30 may wait for an RACH operation of the UE 10. At step S1605, the SN 30 may transmit to the MN 20 an SN modification ack message including an SCG configuration for RACH and MAC reset. At step S1610, the MN 20 may transmit the received configuration to the UE 10. Accordingly, the UE 10 may reset its MAC entity at step S1615. At step S1620, the UE 10 may transmit an RACH to the SN 30.

According to an alternative embodiment, if the RACH, MAC, and RLC reset is indicated as the operation necessary for the synchronous reconfiguration, the SN 30 may reset all RLC entities associated with the corresponding UE 10 and a MAC. Afterward, the SN 30 may wait for an RA from the UE 10. In detail, as shown in FIG. 16B, the SN 30 may transmit, at step S1625, to the MN 20 an SN modification ack message including an SCG configuration for RACH, MAC, and RLC reset. At step S1630, the MN 20 may transmit the received configuration to the UE 10. Accordingly, the UE 10 may reset its MAC and RLC at step S1635. At step S1640, the UE may transmit an RACH to the SN 30.

According to an alternative embodiment, if the RACH and MAC/RAC reset and PDCP reestablishment are indicated as the operation necessary for the synchronous reconfiguration, the SN 30 may reestablish a PDCP associated with the corresponding UE and reset RLC and MAC. Afterward, the SN 30 may wait for an RA from the UE. In detail, as shown in FIG. 16C, the SN 30 may transmit to the MN 20, at step S1645, an SN modification ack message including an SCG configuration for RACH and MAC/RLC reset and PDCP reestablishment. At step S1650, the MN 20 may transmit the received configuration to the UE 10. Accordingly, the UE 10 may reset its MAC and RLC at step S1655. Next, the UE may perform PDCP reestablishment. At step S1660, the UE 10 may also transmit an RACH to the SN 30.

In the embodiments of FIGS. 16A to 16C, the SN 30 may check an SCG change indication IE of the SN modification request message transmitted by the MN 20 for a necessary operation and perform the necessary operation and generate a reconfiguration message for the UE. This message is transmitted in a container to the MN 20, which may transmit the message generated by the SN 30 to the UE 10 for reconfiguring the UE 10. In summary, the UE 10 performs MAC reset and RACH in the embodiment of FIG. 16A, MAC/RLC reset and RACH in the embodiment of FIG. 16B, and MAC/RLC reset, PDCP reestablishment, and RACH in the embodiment of FIG. 16C. It may also be possible for the SCG change indicator to indicate only a reconfiguration and for the UE to perform the corresponding operation. The necessary operations may be called by names indicative of situations requiring the corresponding operations rather than the operations themselves. For example, reconfiguration may be called as reconfiguration without MAC reset, RACH by RACH, RACH and MAC reset by reconfiguration with MAC reset, RACH and MAC/RLC reset by traditional handover but without PDCP reestablishment, and RACH and MAC/RLC/PDCP reset/reestablish by traditional HO.

Figure 17A:
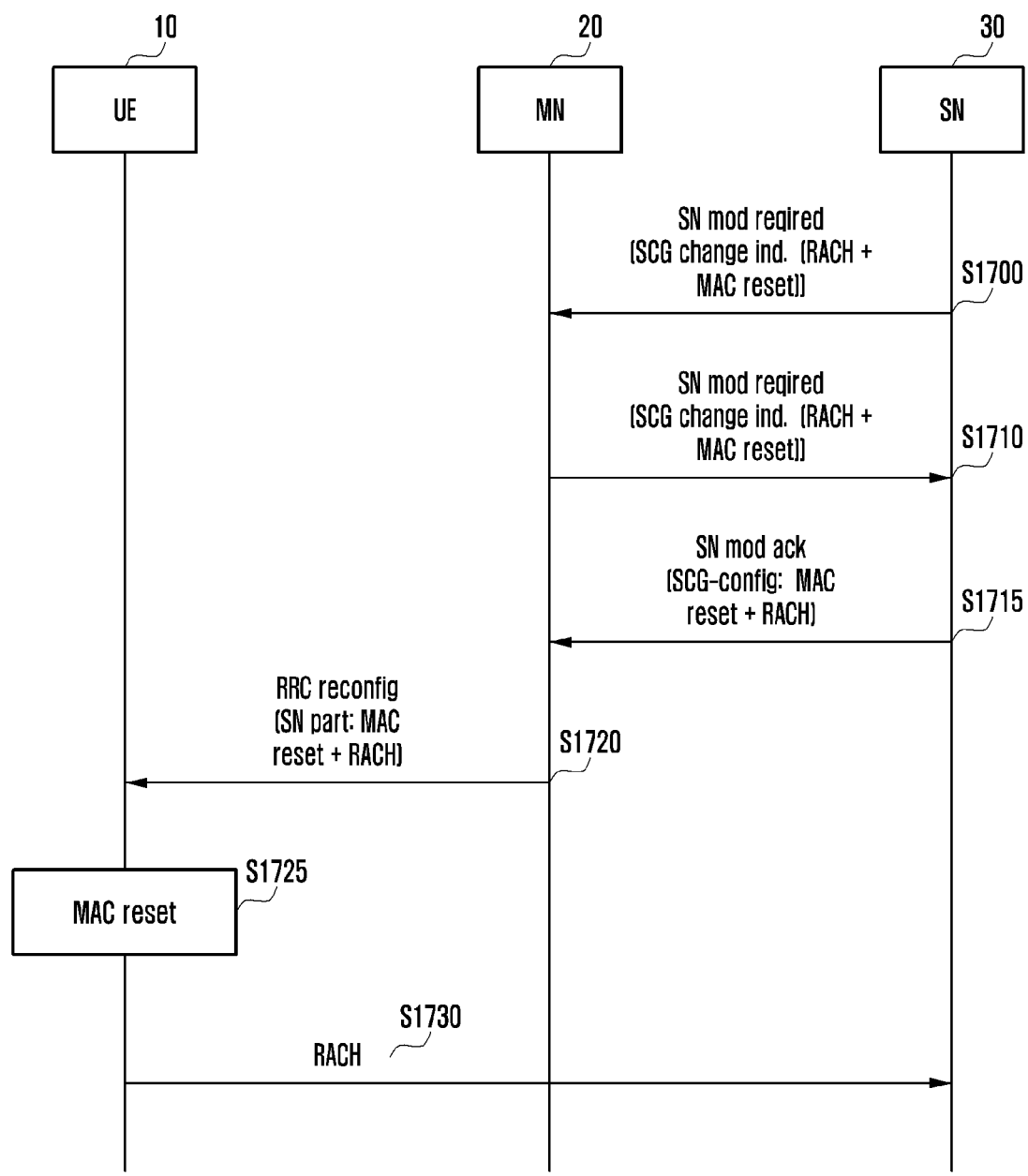
FIGS. 17A to 17C are signal flow diagrams illustrating SN-initiated SCG change procedures for transmitting an SN modification required message including an SCG change indication IE indicating a necessary operation from an SN to an MN according to various embodiments.
Figure 17B:
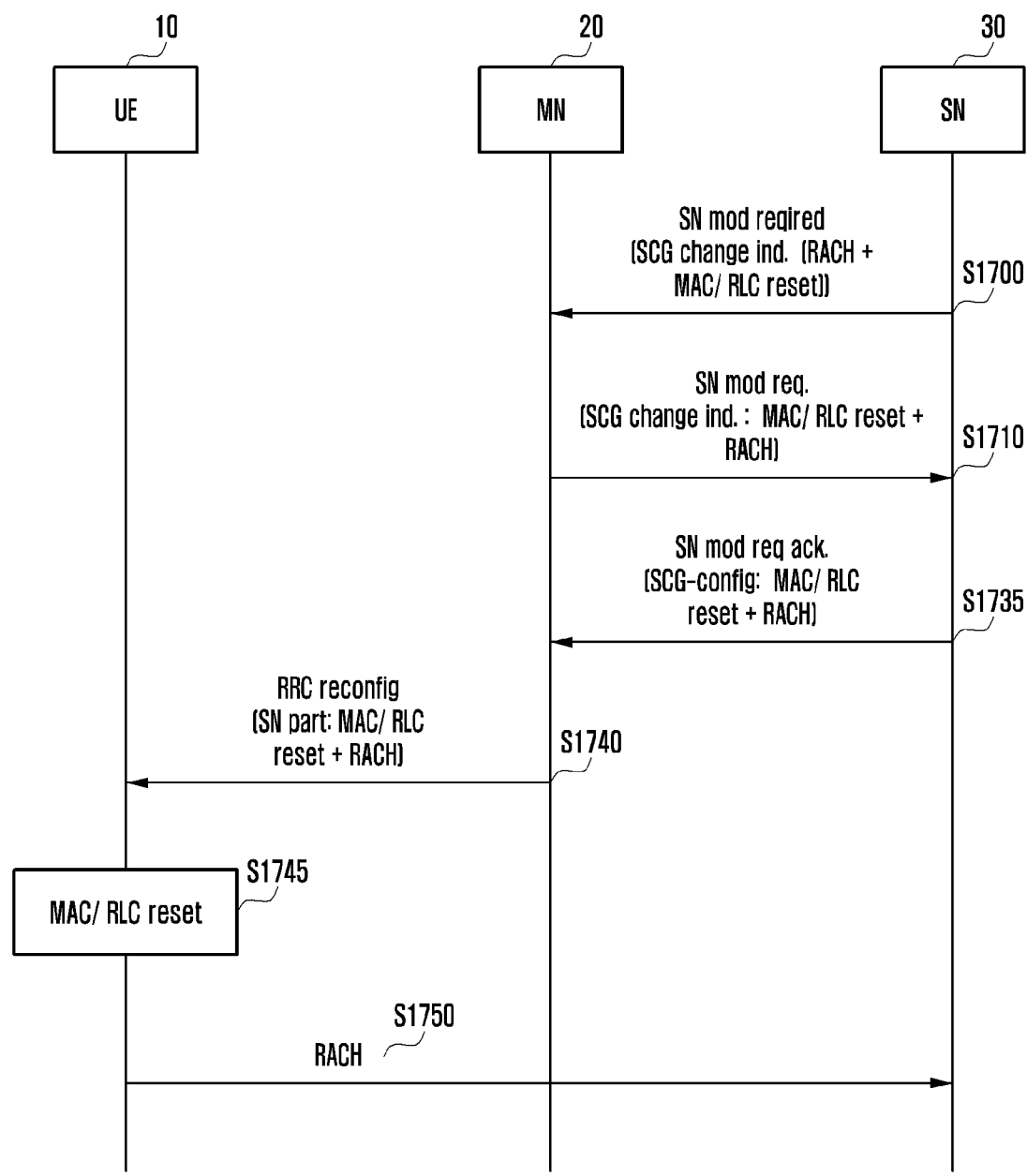
Figure 17C:
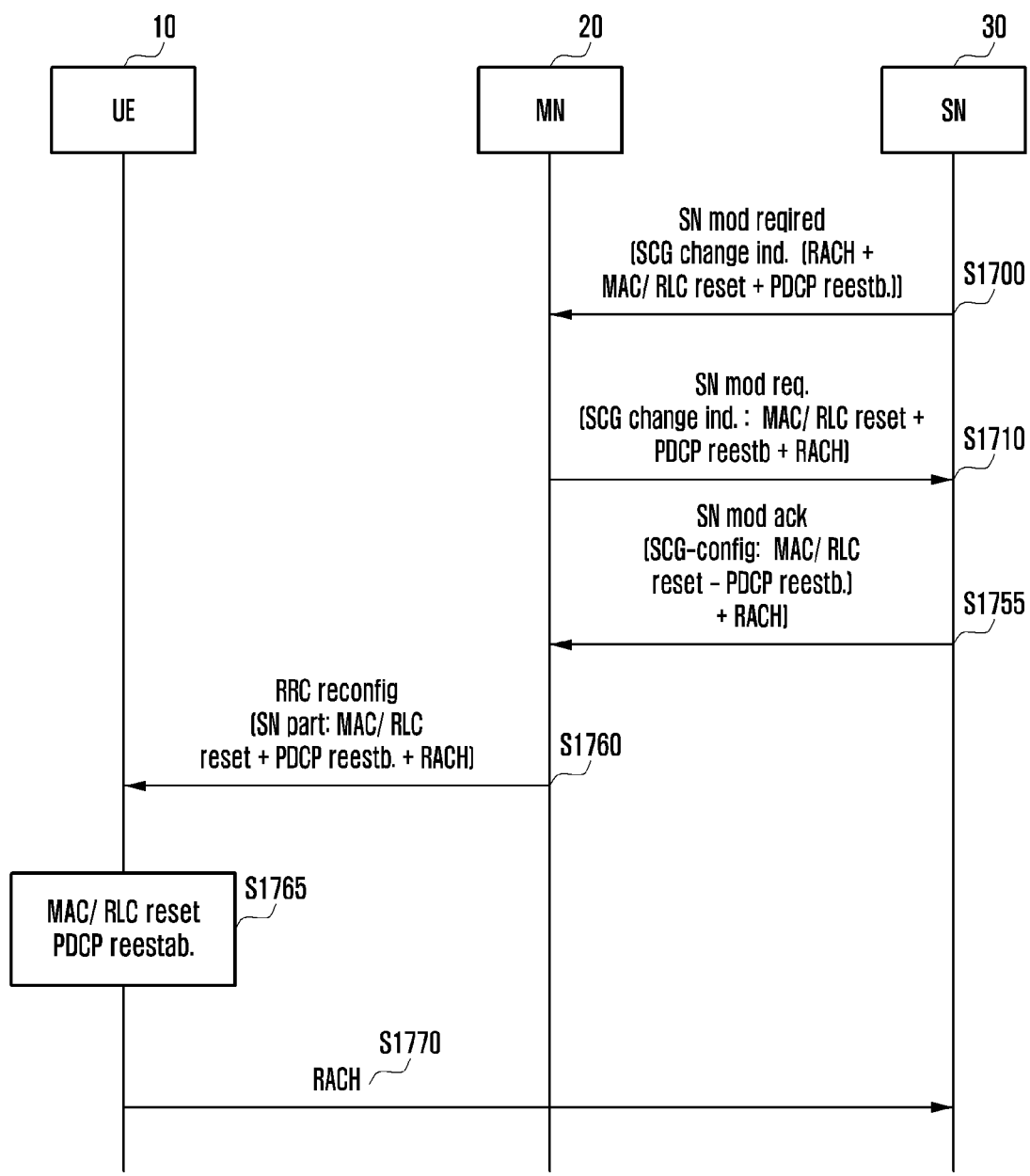

FIGS. 17A to 17C are signal flow diagrams illustrating SN-initiated SCG change procedures according to various embodiments. In detail, an SN 30 may transmit, at step S1700, to an MN 20 an SN modification required message including an SCG change indication IE indicating a necessary operation. Upon receipt of this message, the MN 20 may generate an SN modification request message including the SCG change indication IE indicating the necessary operation and transmit the SN modification request message to the SN 30 at step S1710. In detail, if the SN 30 detects one of the events described in the above embodiments, it may transmit to the MN 20 the SN modification required message including the SCG change indication IE indicating an operation necessary for synchronous reconfiguration. The necessary operation is as follows: reconfiguration, RACH, RACH and MAC reset, RACH and MAC reset and RLC reset, and RACH and MAC reset and RLC reset and PDCP re-establishment.

Next, the MN 20 may generate an SN modification request message. The MN 20 may transmit to the SN addition 30 an SN modification request message including the SCG change indication IE indicating the necessary operation received from the SN 30.

Upon receipt of the SN modification request message, the SN 30 may perform an SN side operation for the necessary operation. For example, for a normal reconfiguration rather than a sublayer reset of an L2 stack, the SN may perform the corresponding reconfiguration and, if the message indicates RACH, monitor an RACH for a random access preamble from the corresponding UE, dispensing with the other operations.

As shown in FIG. 17A, if the RACH and MAC reset is indicated as the operation necessary for synchronous reconfiguration, the SN 30 may reset its MAC associated with the corresponding UE. Afterward, the SN 30 may wait for an RACH operation of the UE 10. At step S1715, the SN 30 may transmit to the MN 20 an SN modification ack message including an SCG configuration for RACH MAC reset. At step S1720, the MN 20 may transmit the received configuration to the UE 10. Accordingly, the UE 10 may reset its MAC at step S1725. At step S1730, the UE 10 may transmit an RACH to the SN 30.

According to an alternative embodiment, if the RACH, MAC, and RLC reset is indicated as the operation necessary for the synchronous reconfiguration, the SN 30 may reset all RLC entities associated with the corresponding UE 10 and a MAC. Afterward, the SN 30 may wait for an RA preamble from the UE 10. In detail, as shown in FIG. 17B, the SN 30 may transmit, at step S1735, to the MN 20 an SN modification ack message including an SCG configuration for RACH, MAC, and RLC reset. At step S1740, the MN 20 may transmit the received configuration to the UE 10. Accordingly, the UE 10 may reset its MAC and RLC at step S1745. At step S1750, the UE 10 may transmit an RACH to the SN 30.

According to an alternative embodiment, if the RACH and MAC/RAC reset and PDCP reestablishment are indicated as the operation necessary for the synchronous reconfiguration, the SN 30 may reestablish a PDCP associated with the corresponding UE and reset RLC and MAC. Afterward, the SN 30 may wait for an RA from the UE 10. In detail, as shown in FIG. 17C, the SN 30 may transmit to the MN 20, at step S1755, an SN modification ack message including an SCG configuration for RACH and MAC/RLC reset and PDCP reestablishment. At step S1760, the MN 20 may transmit the received configuration to the UE 10. Accordingly, the UE 10 may reset its MAC and RLC at step S1765. Next, the UE may perform PDCP reestablishment. At step S1770, the UE 10 may also transmit an RACH to the SN 30.

As described in the embodiments of FIGS. 17A to 17C, upon receipt of the SN modification required message, the MN 20 may transmit an SN modification request message to the SN 30 which has transmitted the SN modification required message to instruct the SN 30 to perform the corresponding operation.

Here, the necessary operations may be called by names indicative of situations requiring the corresponding operations rather than the operations themselves. For example, reconfiguration may be called as reconfiguration without MAC reset, RACH by RACH, RACH and MAC reset by reconfiguration with MAC reset, RACH and MAC/RLC reset by traditional handover but without PDCP reestablishment, and RACH and MAC/RLC/PDCP reset/reestablish by traditional HO.

Figure 18:
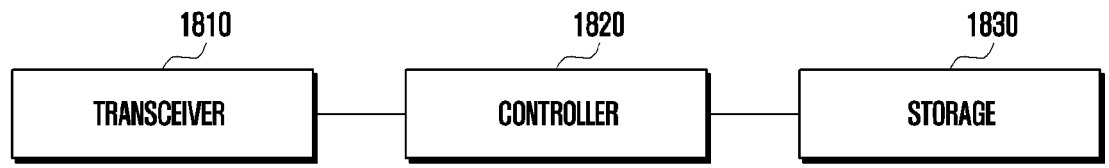
FIG. 18 is a block diagram illustrating a configuration of a UE according to an embodiment of the disclosure.

FIG. 18 is a block diagram illustrating a configuration of a UE according to an embodiment of the disclosure.

In reference to FIG. 18, the UE may include a transceiver 1810, a controller 1820, and a storage unit 1830. In the disclosed embodiment, the controller 1820 may be defined as a circuit, an application-specific integrated circuit, or at least one processor.

The transceiver 1810 may communicate signals with a network entity. For example, the transceiver 1810 may receive system information and synchronization and reference signals from a base station.

The controller 1820 may control overall operations of the UE that are proposed in the disclosed embodiments.

For example, the controller 1820 may control the transceiver 1810 to transmit, in the case where a connection to a first master node (MN) is released, an RRC connection reestablishment request message including secondary node (SN) identification information to a second MN and receive, in the case where the second MN has context information of the UE, an RRC connection reestablishment message from the second MN.

In which case, the second MN may transmit an SN addition request message to the SN based on the SN identification information.

The RRC connection reestablishment request message may also include bearer information for the SN.

The SN may include a radio resource control (RRC) layer.

The storage unit 1830 may store at least one of information transmitted/received by the transceiver 1810 and information generated by the controller 1820.

Figure 19:
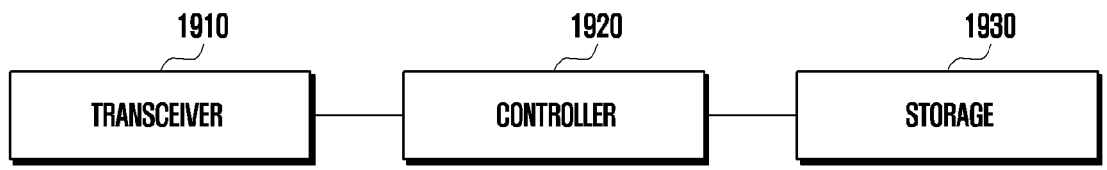
FIG. 19 is a block diagram illustrating a configuration of a base station according to an embodiment of the disclosure.

FIG. 19 is a block diagram illustrating a configuration of a base station according to an embodiment of the disclosure. The base station may be an eNB (including MeNB and SeNB) of an LTE system or a gNB of an NR system.

In reference to FIG. 19, the base station may include a transceiver 1910, a controller 1920, and a storage unit 1930. In the disclosed embodiment, the controller 1920 may be defined as a circuit, an application-specific integrated circuit, or at least one processor.

The transceiver 1910 may communicate signals with other network entities. For example, the transceiver 1910 may transmit system information and synchronization and reference signals to a UE.

The controller 1920 may control overall operations of the base station that are proposed in the disclosed embodiments. For example, the controller 1920 may control the transceiver 1910 to receive, in the case where the base station is a second MN, an RRC connection reestablishment request message including SN identification information from a UE of which the connection to a first MN is released and transmit, in the case where the second MN has context information of the UE, an RRC connection reestablishment message to the UE.

The controller 1920 may control the transceiver 1910 to transmit an SN addition request message to the SN based on the SN identification information.

The RRC connection reestablishment request message may also include bearer information for the SN.

The SN may include a radio resource control (RRC) layer.

The storage unit 1930 may store at least one of information transmitted/received by the transceiver 1910 and information generated by the controller 1920.

Although the embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure.

The invention claimed is:

1. A method performed by a terminal in a wireless communication system, the method comprising:
   identifying a master cell group (MCG) failure, the MCG associated with a first base station;
   suspending an MCG transmission for a radio bearer (RB) based on the MCG failure;
   identifying whether a signaling radio bearer (SRB) associated with a second base station is configured, the SRB associated with the second base station being configured independently of the MCG associated with the first base station;
   in case that the SRB associated with the second base station is configured, transmitting, to the second base station, a first radio resource control (RRC) message including MCG failure information via the SRB associated with the second base station; and
   receiving, from the second base station via the SRB associated with the second base station, based on the MCG failure, an RRC message associated with an RRC release of an RRC connection associated with the second base station,
   wherein a second RRC message including the MCG failure information is transmitted from the second base station which has received the MCG failure information to the first base station.

2. The method of claim 1, wherein identifying the MCG failure comprises:
   detecting a radio link failure of the MCG.

3. The method of claim 1, wherein the MCG failure information includes a measurement result of a serving cell associated with the MCG and a measurement result of a neighboring cell.

4. The method of claim 1, further comprising:
   receiving, from the second base station, an RRC connection reconfiguration message via the SRB associated with the second base station.

5. A method performed by a second base station in a wireless communication system, the method comprising:
   receiving, from a terminal, a first radio resource control (RRC) message including master cell group (MCG) failure information via a signaling radio bearer (SRB) associated with the second base station, in case that the SRB associated with the second base station is configured, an MCG failure is identified and a MCG transmission for a radio bearer (RB) is suspended, the MCG associated with a first base station, the SRB associated with the second base station being configured independently of the MCG associated with the first base station;
   transmitting, to the first base station, a second RRC message including the MCG failure information; and
   transmitting, to the terminal via the SRB associated with the second base station, an RRC message associated with an RRC release of an RRC connection associated with the second base station, based on the MCG failure.

6. The method of claim 5, wherein the MCG failure comprises a radio link failure of the MCG.

7. The method of claim 5, wherein the MCG failure information includes a measurement result of a serving cell associated with the MCG and a measurement result of a neighboring cell.

8. A terminal in a wireless communication system, the terminal comprising:
   a transceiver; and
   at least one processor configured to:
      identify a master cell group (MCG) failure, the MCG associated with a first base station,
      suspend an MCG transmission for a radio bearer (RB) based on the MCG failure,
      identify whether a signaling radio bearer (SRB) associated with a second base station is configured, the SRB associated with the second base station being configured independently of the MCG associated with the first base station,
      in case that the SRB associated with the second base station is configured, control the transceiver to transmit, to the second base station, a first radio resource control (RRC) message including MCG failure information via the SRB associated with the second base station, and control the transceiver to receive, from the second base station via the SRB associated with the second base station, based on the MCG failure, an RRC message associated with an RRC release of an RRC connection associated with the second base station, wherein a second RRC message including the MCG failure information is transmitted from the second base station which has received the MCG failure information to the first base station.

9. The terminal of claim 8, wherein the at least one processor is further configured to:

detect a radio link failure of the MCG.

10. The terminal of claim 8, wherein the MCG failure information includes a measurement result of a serving cell associated with the MCG and a measurement result of a neighboring cell.

11. The terminal of claim 8, wherein the at least one processor is further configured to:

control the transceiver to receive, from the second base station, an RRC connection reconfiguration message via the SRB associated with the second base station.

12. A second base station in a wireless communication system, the second base station comprising:

a transceiver; and at least one processor configured to:

control the transceiver to receive, from a terminal, a first radio resource control (RRC) message including master cell group (MCG) failure information via a signaling radio bearer (SRB) associated with the second base station, in case that the SRB associated with the second base station is configured, an MCG failure is identified and a MCG transmission for a radio bearer (RB) is suspended, the MCG associated with a first base station, the SRB associated with the second base station being configured independently of the MCG associated with the first base station, control the transceiver to transmit, to the first base station, a second RRC message including the MCG failure information, and control the transceiver to transmit, to the terminal via the SRB associated with the second base station, an RRC message associated with an RRC release of an RRC connection associated with the second base station, based on the MCG failure.

13. The second base station of claim 12, wherein the MCG failure comprises a radio link failure of the MCG.

14. The second base station of claim 12, wherein the MCG failure information includes a measurement result of a serving cell associated with the MCG and a measurement result of a neighboring cell.

\* \* \* \* \*